United States Patent
Nagata et al.

(10) Patent No.: US 8,206,020 B2
(45) Date of Patent: Jun. 26, 2012

(54) PLANAR ILLUMINATING DEVICE AND LIQUID CRYSTAL DISPLAY DEVICE USING THE SAME

(75) Inventors: Takayuki Nagata, Osaka (JP); Tatsuo Itoh, Osaka (JP); Kazuhisa Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 451 days.

(21) Appl. No.: 12/521,046

(22) PCT Filed: Dec. 11, 2007

(86) PCT No.: PCT/JP2007/073817
§ 371 (c)(1),
(2), (4) Date: Jun. 24, 2009

(87) PCT Pub. No.: WO2008/078543
PCT Pub. Date: Jul. 3, 2008

(65) Prior Publication Data
US 2009/0316431 A1    Dec. 24, 2009

(30) Foreign Application Priority Data

| Dec. 26, 2006 | (JP) | 2006-349167 |
| Apr. 2, 2007 | (JP) | 2007-096228 |
| Jul. 18, 2007 | (JP) | 2007-186624 |

(51) Int. Cl.
*F21V 7/04* (2006.01)
(52) U.S. Cl. .......... 362/609; 362/259; 362/612
(58) Field of Classification Search .......... 362/609, 362/611, 612, 613, 628, 259, 297
See application file for complete search history.

(56) References Cited

U.S. PATENT DOCUMENTS

| 6,575,584 B1 * | 6/2003 | Habraken | 362/609 |
| 7,121,685 B2 * | 10/2006 | Remillard et al. | 362/231 |
| 7,703,970 B2 * | 4/2010 | Blach | 362/609 |
| 7,918,600 B2 * | 4/2011 | Nagata et al. | 362/616 |
| 8,029,179 B2 * | 10/2011 | Itoh et al. | 362/608 |
| 2002/0008969 A1 | 1/2002 | Mabuchi et al. | |
| 2005/0276566 A1 | 12/2005 | Iimura | |

FOREIGN PATENT DOCUMENTS

| JP | 11-144514 | 5/1999 |
| JP | 2000-11723 | 1/2000 |
| JP | 2002-98838 | 4/2002 |
| JP | 2005-353556 | 12/2005 |
| JP | 2006-40639 | 2/2006 |
| JP | 2006-202703 | 8/2006 |

OTHER PUBLICATIONS

International Search Report issued Mar. 11, 2008 in the International (PCT) Application of which the present application is the U.S. National Stage.

* cited by examiner

*Primary Examiner* — John A Ward
(74) *Attorney, Agent, or Firm* — Wenderoth, Lind & Ponack, L.L.P.

(57) ABSTRACT

Provided is a planar illuminating device having light source section (1) emitting linearly polarized laser light and having a light guide (12) with a rectangular parallelepiped shape having one main surface with a mirror array (12c) thereon. The mirror array (12c) has a plurality of reflecting surfaces totally reflecting laser light incident on an incident surface (12a), of the light guide, perpendicular to the one main surface and emits the laser light from an emitting surface (12b), of the light guide, perpendicular to the one main surface, wherein the reflecting surfaces are formed in a stepped manner. Further, the planar illuminating device includes a light-guiding plate (3) making the laser light, emitted from the light guide (12), incident on an incident surface (3a) of the light-guiding plate and emitting the laser light from an emitting surface (3b) of the light-guiding plate.

20 Claims, 19 Drawing Sheets

F I G. 1 1
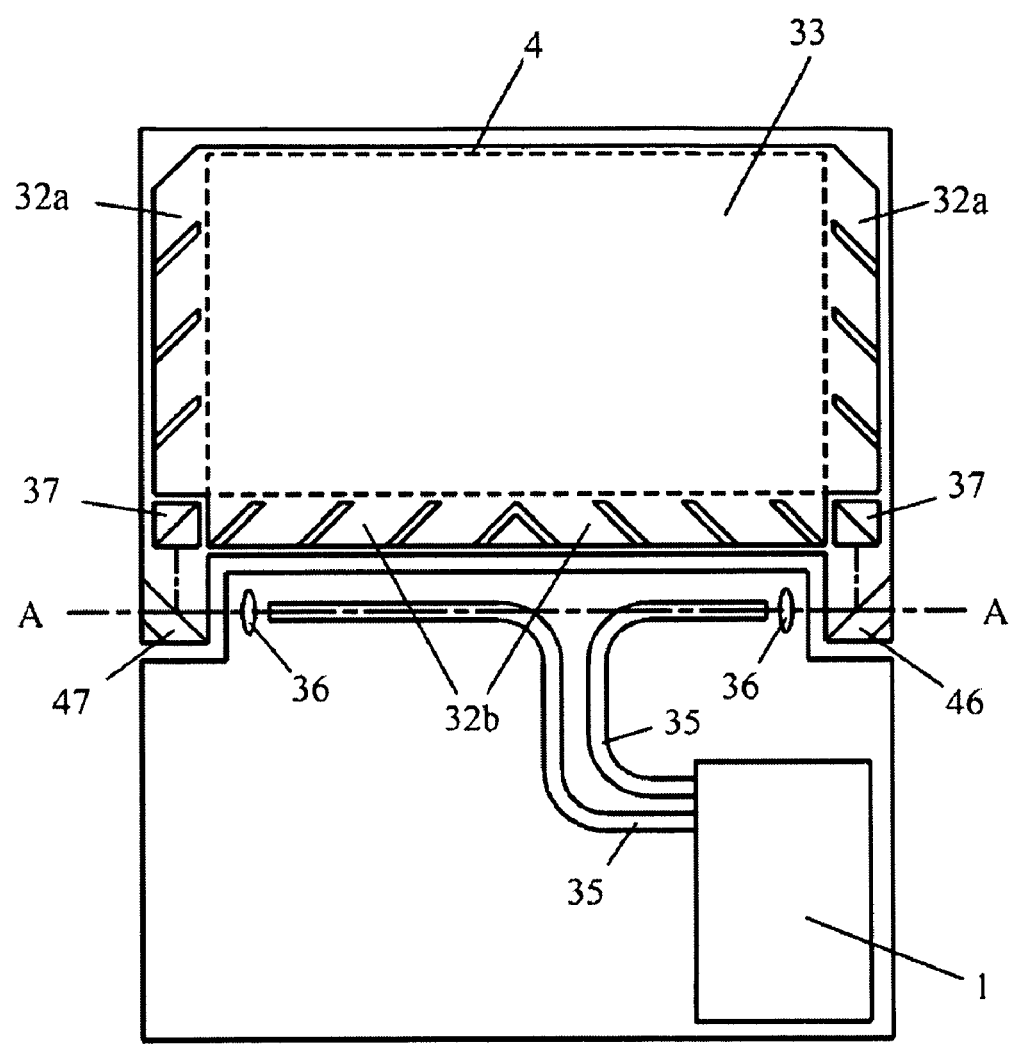

F I G. 1 3
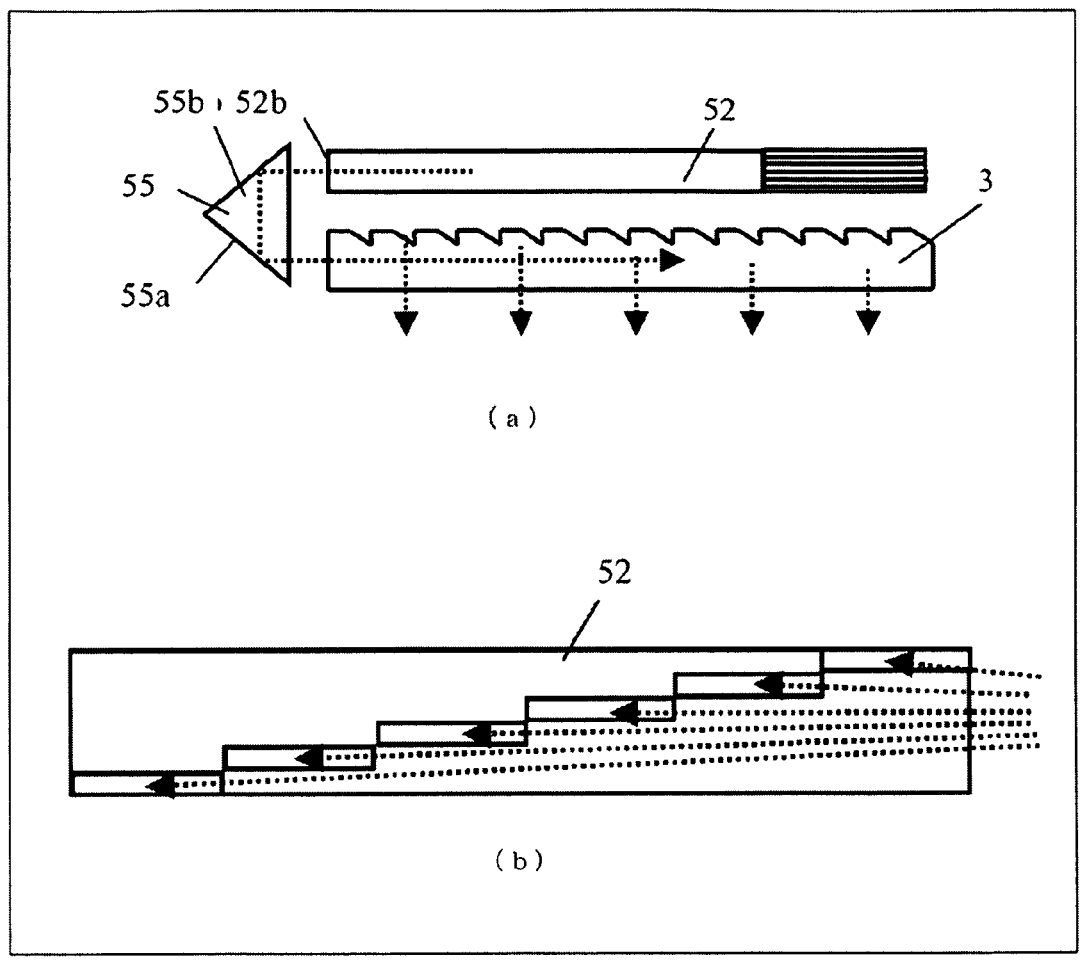

FIG. 16
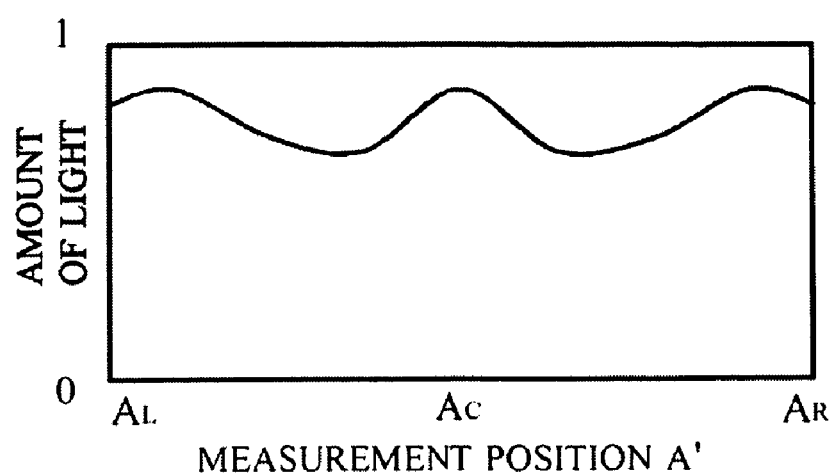
(a)
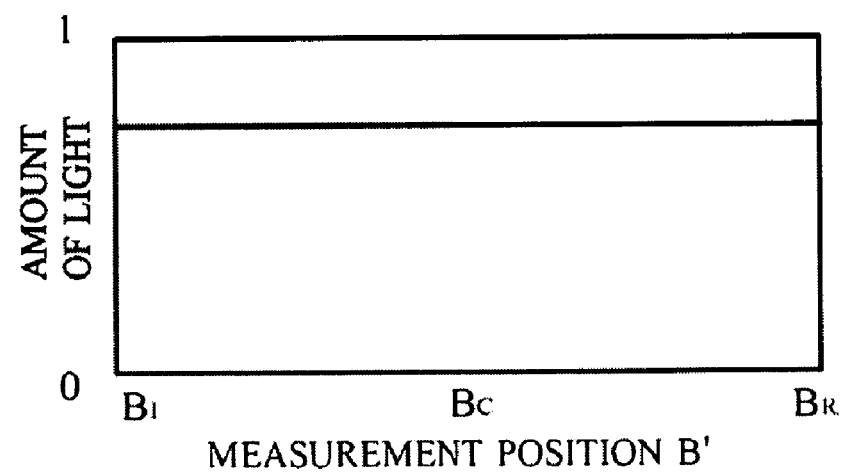
(b)

F I G. 1 7 A
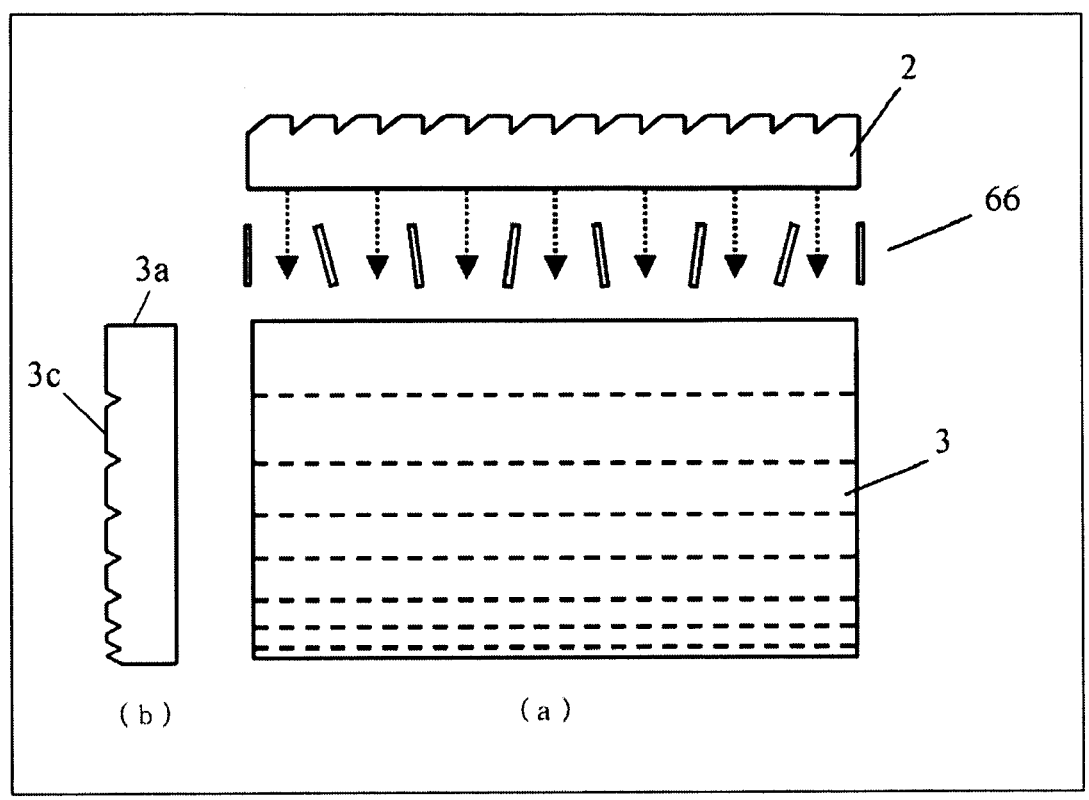

PLANAR ILLUMINATING DEVICE AND LIQUID CRYSTAL DISPLAY DEVICE USING THE SAME

TECHNICAL FIELD

The present invention relates to a planar illuminating device using laser light as a light source, and to a liquid crystal display device using the planar illuminating device.

BACKGROUND ART

Conventionally, for a liquid crystal display device employing a liquid crystal display panel, backlight illumination applying cold cathode fluorescent tubes is widely used. In recent years, backlight illumination is also being developed that uses light-emitting diodes (LED devices) in three colors of red light, green light, and blue light, so as to reproduce more vivid and more natural color tones.

Of these types of backlight illumination, one that is of large size and therefore requires high brightness uses a subjacent illuminating device, in which cathode fluorescent tubes or LED devices are arranged in a planar manner. On the other hand, one that is of relatively small size uses a lateral light-source, or commonly known as edge-light, planar illuminating device, in which the light from a light source is incident on a side surface (an incident surface) of a light-guiding plate and is emitted from one main surface (an emitting surface) of the light-guiding plate, so as to provide illumination.

It is considered that in the future, a liquid crystal display device will increasingly be demanded to be thinner and have a wider screen as in a wall-mounted television and the like. However, it is more difficult to make the subjacent illuminating device thinner than to make the edge-light illuminating device thinner, and on the other hand, it is impossible to secure sufficient brightness of the edge-light illuminating device if the device is used for a wider screen.

In response, an attempt to realize a thin wide-screen liquid crystal display device with the use of laser devices that have high brightness and are suitable for high power, as a light source of the edge-light illuminating device, is also coming under review.

The use of high power laser devices as a light source makes it possible to make the number of the components far smaller than the use of LED devices. On the other hand, in a simple structure where components are arranged on a side surface of a light-guiding plate, the number of the components is so small as to cause uneven brightness. Accordingly, the use of laser devices as a light source requires an optical system in which laser light is linearly spread so as to uniformly illuminate the side surface of the light-guiding plate.

A method of producing such linear illumination is disclosed in Patent Document 1, for example, which proposes a structure where LED devices are arranged on an edge surface of a rod-like light guide (a light-guiding rod) and thereby provide linear illumination. It is considered that this structure is also effective if the LED devices are replaced by laser devices.

In addition, in a liquid crystal display device, it is important not only to address a thin wide screen but also to address high brightness and low power consumption, and particularly, the reduction of the power of a backlight device, which constitutes the majority of the power consumption, is an important issue.

A method of such power reduction is disclosed in Patent Document 2, for example. Normally, light is emitted from a backlight while unpolarized, and therefore half the light is blocked by an incident-side polarizing plate of a liquid crystal display panel. However, the structure proposed in Patent Document 2 provides LED devices with polarization anisotropies so that backlight illumination is polarizable, and thereby improves the light utilization efficiency. Since laser devices are highly polarizable, it is considered that the use of polarization is also effective if laser devices are used.

Patent Document 1: Japanese Laid-Open Patent Publication No. 2000-11723
Patent Document 2: Japanese Laid-Open Patent Publication No. 2006-40639

DISCLOSURE OF THE INVENTION

Problems to be Solved by the Invention

However, even if the LED devices of the light sources of the structures of these Patent Documents are merely replaced by laser devices, it may be possible to form a thin wide-screen display, but it is impossible to sufficiently improve light utilization efficiency or reduce uneven brightness.

First, in the structure of Patent Document 1, the polarization of the light source is not taken into consideration. In this structure, normally, the light emitted from the light source and incident on the light-guiding rod is propagated within the light-guiding rod while reflected in all directions, and therefore the polarization of the light is disturbed when the light is emitted from the light-guiding rod. Thus even when highly polarizable laser devices are merely used as the light source of Patent Document 1, it is impossible to sufficiently improve the efficiency using polarization.

Second, in the structure of Patent Document 2, a plurality of light sources are arranged on a side surface of a light-guiding plate. Thus when highly polarizable laser devices are used as the light sources of the Patent Document 2, uneven brightness becomes an issue if several laser devices are used, and the increase in component cost becomes an issue if a large number of laser devices are used.

Therefore an object of the present invention is to provide a planar illuminating device, using laser devices as a light source, that realizes high light utilization efficiency, low power consumption, and high brightness without color irregularities, and to provide a liquid crystal display device using the same.

Solution to the Problems

The present invention is directed to a planar illuminating device and to a liquid crystal display device including a liquid crystal display panel that uses the planar illuminating device for illumination. To achieve the above objects, the planar illuminating device of the present invention includes: a light source section that emits linearly polarized laser light; a light guide that is shaped as a rectangular parallelepiped whose at least one main surface has a mirror array thereon, the mirror array having formed thereon a plurality of reflecting surfaces that totally reflect the laser light incident on an incident surface, of the light guide, perpendicular to the at least one main surface and emit the laser light from an emitting surface, of the light guide, perpendicular to or opposite to the at least one main surface; and a light-guiding plate that makes the laser light, emitted from the light guide, incident on an incident surface of the light-guiding plate and emits the laser light from an emitting surface of the light-guiding plate, and the laser light emitted from the light source section is incident on the light guide while polarized perpendicularly to or parallel to the long side and the short side of the incident surface of the light guide.

The preferred light guide is shaped as the rectangular parallelepiped whose one main surface has the mirror array thereon, the mirror array having formed thereon the plurality of reflecting, surfaces that totally reflect the laser light incident on the incident surface of the light guide and emit the laser light from the emitting surface, of the light guide, opposite to the one main surface. The light guide may be shaped as the rectangular parallelepiped whose one main surface or two main surfaces opposite to each other have the mirror array thereon, the mirror array having formed thereon the plurality of reflecting surfaces that totally reflect the laser light incident on the incident surface of the light guide and emit the laser light from the emitting surface, of the light guide, perpendicular to the one main surface or the two opposite main surfaces, the reflecting surfaces being formed in a stepped manner or being formed having such grooves that the father from the incident surface, the larger the area of the groove.

The light-guiding plate may preferably have a plurality of deflecting grooves parallel to the incident surface of the light-guiding plate, on one main surface, of the light-guiding plate, perpendicular to the incident surface of the light-guiding plate, and the plurality of deflecting grooves are shaped so as to totally reflect, to the other main surface opposite to the one main surface of the light-guiding plate, the laser light incident on the incident surface of the light-guiding plate. The plurality of reflecting surfaces of the mirror array may be angled at 45 degrees to the incident surface of the light guide so as to totally reflect the laser light incident on the incident surface of the light guide. The incident surface or the reflecting surfaces of the light guide may cause the incident laser light to diverge or diffuse in one-dimensional direction. Note that the light guide and the light-guiding plate can also be integrally molded.

The light source section may include: a laser light source: an optical fiber that transmits laser light emitted from the laser light source; and a polarizing beam splitter that polarizes and splits the laser light propagated through the optical fiber, and one part of the polarized light incident on the light guide from the polarizing beam splitter may be then incident on a first incident surface of the light-guiding plate and may be emitted from the emitting surface of the light-guiding plate, while the other part of the polarized light incident on the light guide from the polarizing beam splitter may be then incident on a second incident surface, of the light-guiding plate, perpendicular to the first incident surface and may be emitted from the emitting surface of the light-guiding plate.

A connection section that turns around 180 degrees the laser light emitted from the emitting surface of the light-guiding plate and makes the laser light incident on a second light-guiding plate may be further included. A light orientation guide section provided between the light guide and the light-guiding plate so as to make the laser light, emitted from the light guide, incident on the light-guiding plate by changing an optical path of the laser light may be further included, and light amount distribution on the light-guiding plate may be changed. The light orientation guide section may include a plurality of plate-like reflecting members whose positions or angles are adjustable, and each reflecting member may preferably be thinner in an edge portion than in a central portion. Note that the light-guiding plate may include a plurality of light guides that are separate in accordance with the positions of the plurality of plate-like reflecting members.

Developmentally, a control section that adjusts the light orientation guide section may be further included, and when an image having an aspect ratio different from an aspect ratio of a screen is displayed, the control section may possibly adjust the light orientation guide section so that the light amount distribution concentrates in a center of the light-guiding plate. The control section may adjust the light orientation guide section in accordance with an instruction from a user. A sensor that detects a viewing position of a user may be further included, and the control section may adjust the light orientation guide section in accordance with a distance between a display screen and the user, the distance being detected by the sensor. In this case, when the distance between the display screen and the user is short, the control section may preferably adjust the light orientation guide section so that the light amount distribution concentrates in a center of the light-guiding plate. A plurality of light-receiving devices that detect the light amount distribution of light incident on the light-guiding plate may be further included, and the control section may adjust the light orientation guide section in accordance with the amount of received light detected by the plurality of light-receiving devices.

EFFECT OF THE INVENTION

Based on the present invention, the use of laser devices as a light source makes it possible to realize a wide color gamut and a thin wide screen, and also possible to reduce power consumption due to the improvement of light utilization efficiency. It is also possible to realize a planar illuminating device that reduces uneven brightness even in a wide screen.

BRIEF DESCRIPTION OF THE DRAWINGS

FIG. 11 is a diagram showing an example of the structure of the liquid crystal display device according to the fourth embodiment applied to a laptop.

FIG. 13 is a side elevation view showing the structure of a planar illuminating device according to the fifth embodiment.

FIG. 16 is a diagram showing the light amount distribution before and after light passes through a light orientation guide section 66.

FIG. 17A is a top view and a side elevation view showing another structure of the light-guiding plate 3.

Figure 1:
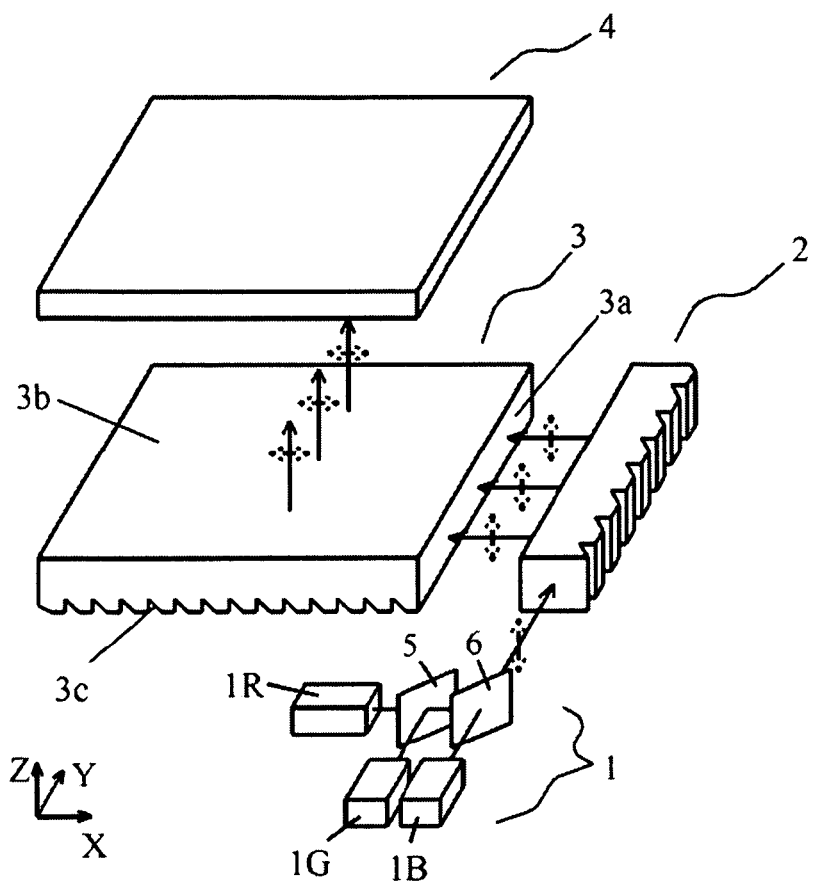
FIG. 1 is a perspective view showing the structure of a liquid crystal display device according to a first embodiment of the present invention.

DESCRIPTION OF THE REFERENCE CHARACTERS 1 light source section
1R red laser light source
1G green laser light source
1B blue laser light source
2, 12, 22, 32a, 32b, 52, 62 light guide
2a, 3a, 12a, 22a, 33a, 33b, 52a, 62d incident surface
2b, 3b, 12b, 22b, 33c, 52b, 62b emitting surface
2c, 3c, 12c, 22c, 38, 52c mirror array
3, 13, 23, 33 light-guiding plate
4 liquid crystal display panel
5, 6 dichroic mirror
34 light collecting lens
35 optical fiber
36 collimating lens
37 polarizing beam splitter
38a, 38b reflecting surface
55 connection section
55a, 55b side surface
66, 86 light orientation guide section
66a-66h orientation guide plate
71-76 light-receiving device

BEST MODE FOR CARRYING OUT THE INVENTION (First Embodiment)

Figure 2:
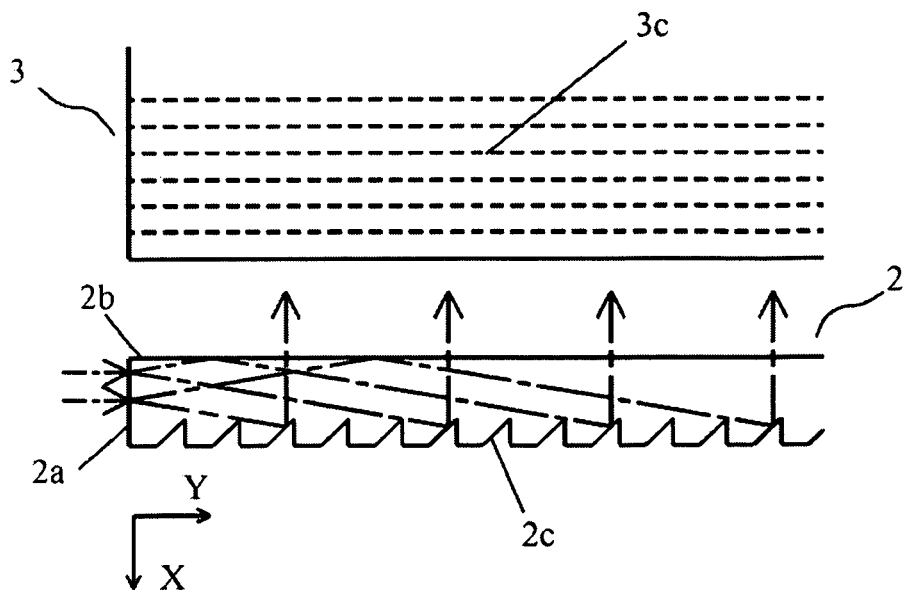
FIG. 2 is a top view of a light guide 2 and a light-guiding plate 3.

FIG. 1 is a perspective view showing the structure of a liquid crystal display device according to a first embodiment of the present invention. The liquid crystal display device according to the first embodiment includes a planar illuminating device provided with a light source section 1, a light guide 2, and a light-guiding plate 3, and also includes a liquid crystal display panel 4. FIG. 2 is a top view of the light guide 2 and the light-guiding plate 3.

First, an overview of each element of the liquid crystal display device according to the first embodiment will be described.

The light source section 1 includes a red laser light source 1R, a green laser light source 1G, a blue laser light source 1B, and dichroic mirrors 5 and 6. Collimated lights in three primary colors that are emitted from the red laser light source 1R, the green laser light source 1G, and the blue laser light source 1B are reflected from the dichroic mirrors 5 and 6, and are combined into one laser light (RGB light) that is emitted while slightly diverging. The planes of polarization of these collimated lights in three primary colors are adjusted in advance so that all of the polarization directions are uniform. In the example of FIG. 1, the planes are adjusted so that light is emitted while polarized in a Z-direction as indicated by dashed arrows. Note that the slight divergence of the RGB light may be implemented by the provision of concavity and convexity or a curvature to an incident surface 2a or a reflecting surface, described below, so as to diffuse light in one dimensional direction.

The light guide 2 is shaped as a rectangular parallelepiped whose one main surface is provided with a mirror array 2c. The light guide 2 makes the RGB light, emitted from the light source section 1, incident on an incident surface 2a, which is one side surface of the light guide 2, and emits the resulting RGB light from an emitting surface 2b, which is the other main surface, while using the reflection caused by the mirror array 2c. The mirror array 2c, provided on the light guide 2, is shaped so as to have a plurality of reflecting surfaces formed at equal intervals in a Y-direction and angled at approximately 45° to the incident surface 2a. It is possible to design the intervals between the plurality of reflecting surfaces with freedom. Dashed-dotted lines in FIG. 2 represent rays of light.

Similarly to the light guide 2, the light-guiding plate 3 is also shaped as a rectangular parallelepiped whose one main surface is provided with a mirror array 3c. The light-guiding plate 3 makes the RGB light, emitted from the light guide 2, incident on an incident surface 3a, which is one side surface of the light-guiding plate 3, and emits the resulting RGB light from an emitting surface 3b, which is the other main surface, while using the reflection caused by the mirror array 3c. The mirror array 3c, provided on the light-guiding plate 3, is shaped so as to have reflecting surfaces formed in parallel to the Y-direction and angled at approximately 45° to the incident surface 3a.

The liquid crystal display panel 4 has a structure where transparent electrodes and liquid crystal molecules are encapsulated between glass substrates, and polarizing plates having different transmission axes are provided on the light-incident side and the light-emitting side, respectively. The liquid crystal display panel 4 is formed so that the transmission axis of the polarizing plate on the light-guiding plate 3 side is directed in an X-direction.

Next, the state of the RGB light propagated in the liquid crystal display device having the above structure will be described.

The RGB light that is emitted from the light source section 1 while polarized in the Z-direction and slightly diverges is incident on the light guide 2. At this time, the positional relation between the light source section 1 and the light guide 2 is determined so that the polarization direction of the RGB light is perpendicular to or parallel to the long side and the short side of the incident surface 2a. A part of the light incident on the incident surface 2a is propagated within the light guide 2 while totally reflected from the top surface, the bottom surface, and the emitting surface 2b. Another part is reflected from and deflected approximately 90° by the plurality of reflecting surfaces provided on the mirror array 2c, and is emitted from the emitting surface 2b. The rest is propagated in the Y-direction. Consequently, the linear light extending in the Y-direction is emitted nearly perpendicularly from the emitting surface 2b.

Here, due to the positional relation between the light source section 1 and the light guide 2, the polarization direction of the light propagated within the light guide 2 is included within a surface containing the traveling direction of the light and the normal vector of the top and bottom surfaces of the light guide 2, and therefore the plane of polarization does not change even when the light is totally reflected from the top surface and the bottom surface. In addition, the polarization direction is orthogonal to a surface containing the traveling direction of the light and the normal vector of the emitting surface 2b and the reflecting surfaces provided on the mirror array 2c, and therefore the polarization direction does not change even when the light is totally reflected from the emitting surface 2b or reflected from the mirror array 2c. Thus a large portion of the light is emitted from the light guide 2 while polarized in the Z-direction.

The light emitted from the light guide 2 is incident on the light-guiding plate 3. A part of the light incident nearly perpendicularly on the incident surface 3a is propagated within the light-guiding plate 3 while totally reflected from the emitting surface 3b. The rest is reflected from and deflected by the mirror array 3c, and is emitted from the emitting surface 3b. Also in the light-guiding plate 3 the light is propagated while a part of the light is reflected from the mirror array 3c and emitted from the emitting surface 3b, and consequently, the emitting surface 3b emits the light in a planar manner.

The polarization direction of the light propagated within the light-guiding plate 3 is also included within a surface containing the traveling direction of the light and the normal vector of the emitting surface 3b and the reflecting surfaces provided on the mirror array 3c, and therefore the plane of polarization does not change even when the light is totally reflected from the emitting surface 3b or reflected from the mirror array 3c. Thus a large portion of the light is emitted from the light-guiding plate 3 while polarized in the X-direction.

A large portion of the light emitted from the light-guiding plate 3 passes through the incident-side polarizing plate of the liquid crystal display panel 4, which has the transmission axis in the X-direction. As a result, a brighter image is displayed on the front surface of the liquid crystal display panel 4 than an image displayed with the use of a conventional illuminating device that emits unpolarized light.

As described above, based on the first embodiment of the present invention, the use of laser devices as a light source makes it possible to increase in size an edge-light planar illuminating device that is suitable to be thin, and also possible to realize a liquid crystal display device having a wide color gamut. In addition, the planar illuminating device emits polarizable light, and thus it is possible to reduce the loss caused by a polarizing plate of a liquid crystal display panel, and therefore possible to realize high light utilization efficiency, high brightness, and low power consumption. Particularly, if the refractive index of a light guide is set to approximately 1.5, the reflection caused by side surfaces and a mirror array of the light guide satisfies total reflection conditions, and therefore the efficiency is high and a mirror coating is unnecessary. Thus it is possible to produce the device at lower cost.

Note that the light guide 2 and the light-guiding plate 3 may be optically bonded to each other. However, since the emitting surface 2b of the light guide 2 is required to totally reflect the propagated light, the adhesive used for the optical bonding may be formed of resin having a lower refractive index than that of the light guide 2.

(Second Embodiment)

Figure 3:
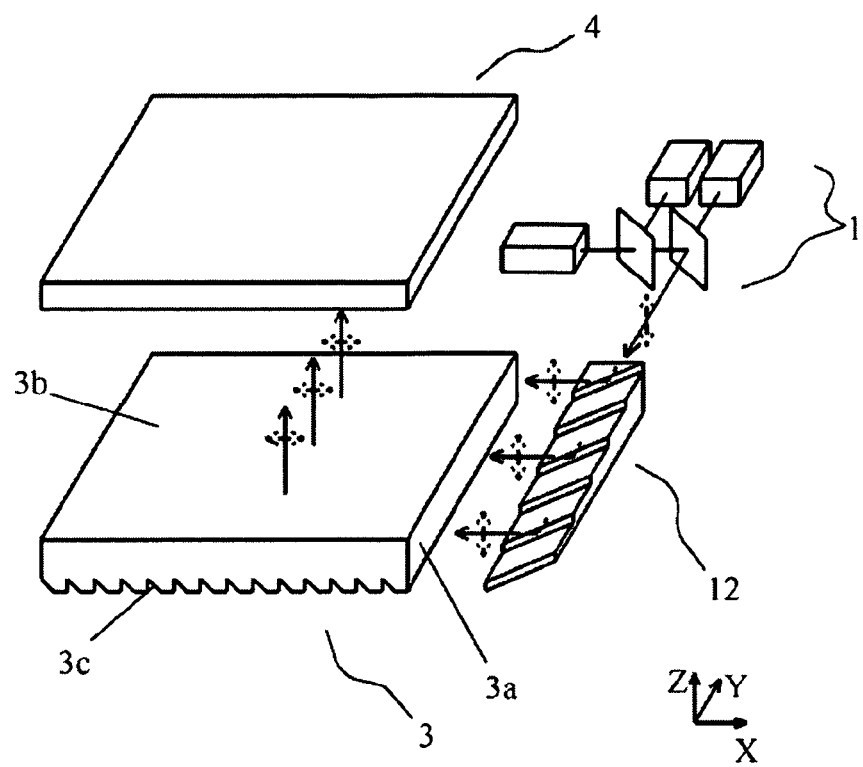
FIG. 3 is a perspective view showing the structure of a liquid crystal display device according to a second embodiment of the present invention.

FIG. 3 is a perspective view showing the structure of a liquid crystal display device according to a second embodiment of the present invention. The liquid crystal display device according to the second embodiment includes a planar illuminating device provided with a light source section 1, a light guide 12, and a light-guiding plate 3, and also includes a liquid crystal display panel 4. The second embodiment is different from the first embodiment in that the second embodiment uses the light guide 12.

Figure 4:
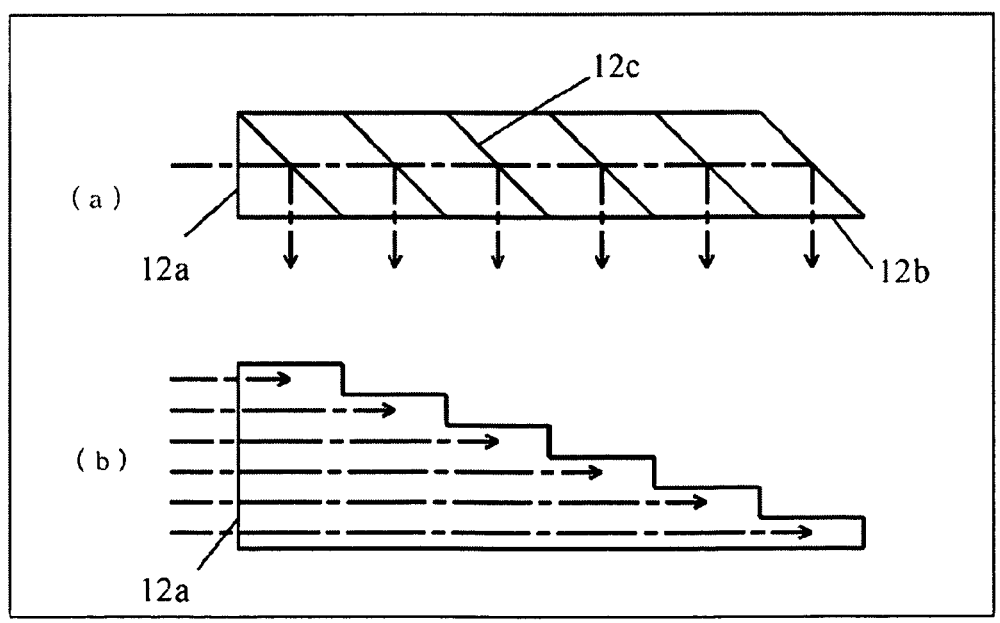
FIG. 4 is a top view and a side elevation view of a light guide 12.

The different element, the light guide 12, will be described below, and the other elements will be denoted by the same numerals as those of the corresponding elements of the first embodiment and will not be described. (a) of FIG. 4 is a top view of the light guide 12. (b) of FIG. 4 is a side elevation view of the light guide 12 as viewed from the light-guiding plate 3. Dashed-dotted lines in FIG. 4 represent rays of light.

The light guide 12 is shaped as a rectangular parallelepiped whose top surface is provided with a mirror array 12c. The light guide 12 makes the RGB light, emitted from the light source section 1, incident on an incident surface 12a, which is one side surface of the light guide 12, and emits the resulting RGB light from an emitting surface 12b, which is a main surface of the light guide 12, while using the reflection caused by the mirror array 12c. The mirror array 12c, provided on the light guide 12, is shaped so as to have a plurality of reflecting surfaces formed at equal intervals in a Y-direction in an equally stepped manner and angled at approximately 45° to the incident surface 12a. The light guide 12 is formed of, for example, acrylic so that light is totally reflected from the reflecting surfaces. Specifically, since the refractive index of acrylic is approximately 1.49 and the critical angle is approximately 42 degrees, each reflecting surface is set to have an incidence angle of 42 degrees or more to the incident light. Note that the reflecting surfaces may have curvatures.

The RGB light that is emitted from the light source section 1 while polarized in a Z-direction and slightly diverges is incident on the light guide 12. At this time, the positional relation between the light source section 1 and the light guide 12 is determined so that the polarization direction of the RGB light is perpendicular to or parallel to the long side and the short side of the incident surface 12a. The light incident on the incident surface 12a is reflected from and deflected approximately 90° by the plurality of reflecting surfaces provided in a stepped manner on the mirror array 12c, and is emitted from the emitting surface 12b. Consequently, the linear light extending in the Y-direction is emitted nearly perpendicularly from the emitting surface 12b.

Here, due to the positional relation between the light source section 1 and the light guide 12, the polarization direction of the light incident on the incident surface 12a is orthogonal to a surface containing the traveling direction of the light and the normal vector of the reflecting surfaces provided on the mirror array 12c, and therefore the polarization direction does not change even when the light is reflected from the mirror array 12c. Thus a large portion of the light is emitted from the light guide 12 while polarized in the Z-direction. The light emitted from the light guide 12 is incident on the light-guiding plate 3.

As described above, based on the second embodiment of the present invention, the use of laser devices as a light source makes it possible to increase in size an edge-light planar illuminating device that is suitable to be thin, and also possible to realize a liquid crystal display device having a wide color gamut. In addition, the provision of a mirror array on the top surface of a light guide makes it possible to form large reflecting surfaces and therefore makes it easy to appropriately form the light guide. Thus it is possible to reduce the angle variation of the light emitted from the light guide. This makes it possible to reduce the polarization variation of the light emitted from a light-guiding plate, and therefore possible to further improve the efficiency.

Figure 7A:
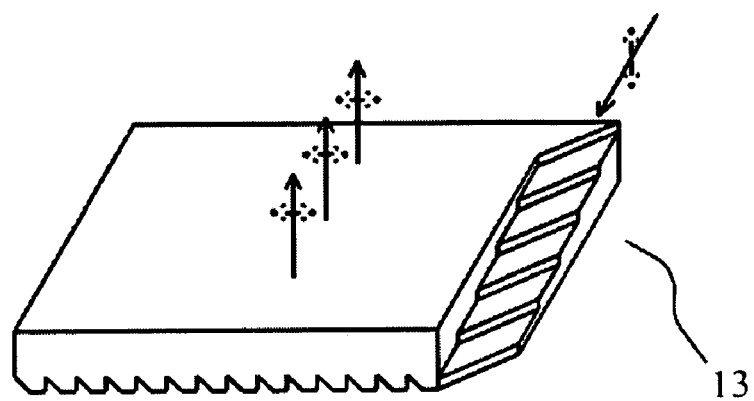
FIG. 7A is a perspective view showing another structure of the planar illuminating device according to the second embodiment.

Note that in the second embodiment the emitting surface 12b of the light guide 12 is not required to totally reflect the propagated light. Accordingly, the light guide 12 and the light-guiding plate 3 can be produced as the same member in an integral manner, as in a component 13 shown in FIG. 7A, and therefore can contribute to the reduction of the number of the components and the reduction of the number of the steps of the manufacturing process.

Figure 7B:
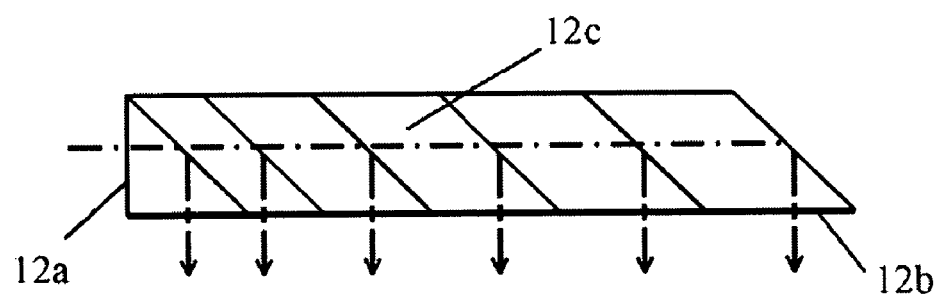
FIG. 7B is a top view showing another structure of the light guide 12.

In the foregoing description an example is shown where the plurality of reflecting surfaces are formed on the mirror array 12c at equal intervals in the Y-direction. However, the longer the transmission distance is, the wider the light becomes, and therefore the reflecting surfaces may be formed so that the farther from the incident surface 12a, the longer the interval, when the closer to the incident surface, the smaller the pencil of light, and the farther from the incident surface, the larger the pencil of light (FIG. 7B).

Figure 7C:
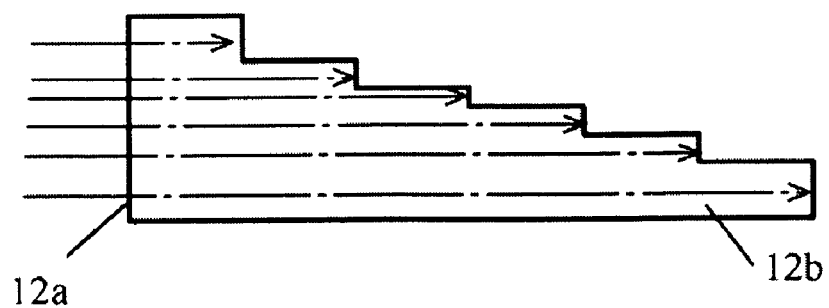
FIG. 7C is a side elevation view showing yet another structure of the light guide 12.

Alternatively, when the light amount distribution of the RGB light incident on the incident surface 12a of the light guide 12 is not uniform (see FIG. 21, for example), the widths (step heights) of the reflecting surfaces may be varied so that a reflecting surface where the amount of light is larger reflects a smaller amount of light and a reflecting surface where the amount of light is smaller reflects a larger amount of light (FIG. 7C).

Yet alternatively, the stepped mirror array of the light guide 12 may be provided on both the top surface and the bottom surface of the rectangular parallelepiped.

(Third Embodiment)

Figure 5:
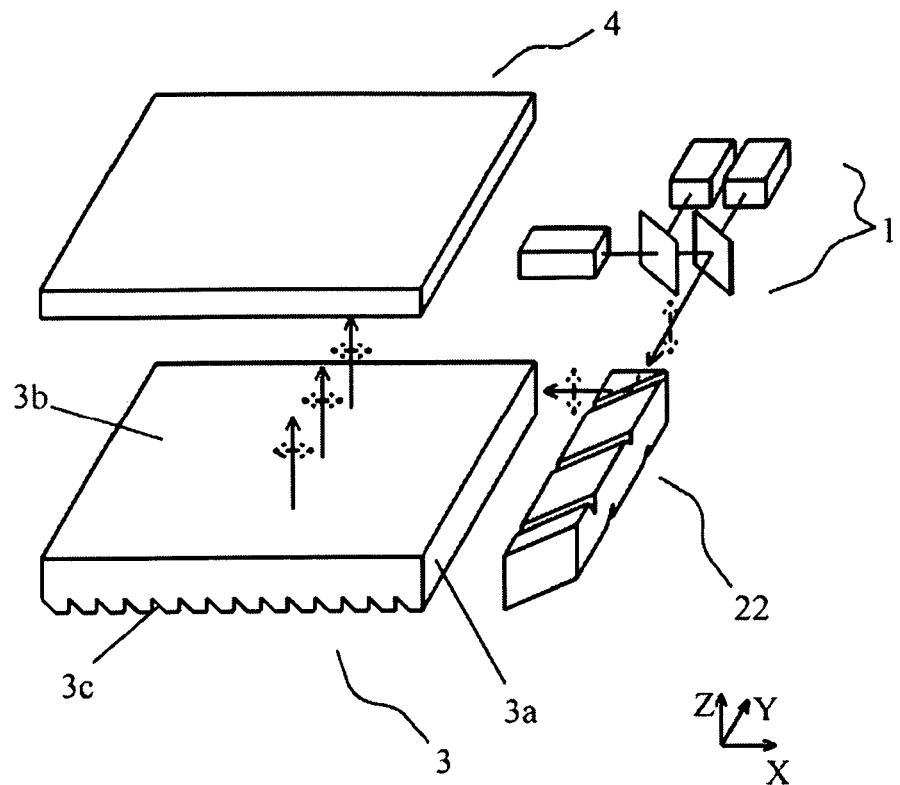
FIG. 5 is a perspective view showing the structure of a liquid crystal display device according to a third embodiment of the present invention.

FIG. 5 is a perspective view showing the structure of a liquid crystal display device according to a third embodiment of the present invention. The liquid crystal display device according to the third embodiment includes a planar illuminating device provided with a light source section 1, a light guide 22, and a light-guiding plate 3, and also includes a liquid crystal display panel 4. The third embodiment is different from the first embodiment in that the third embodiment uses the light guide 22.

Figure 6:
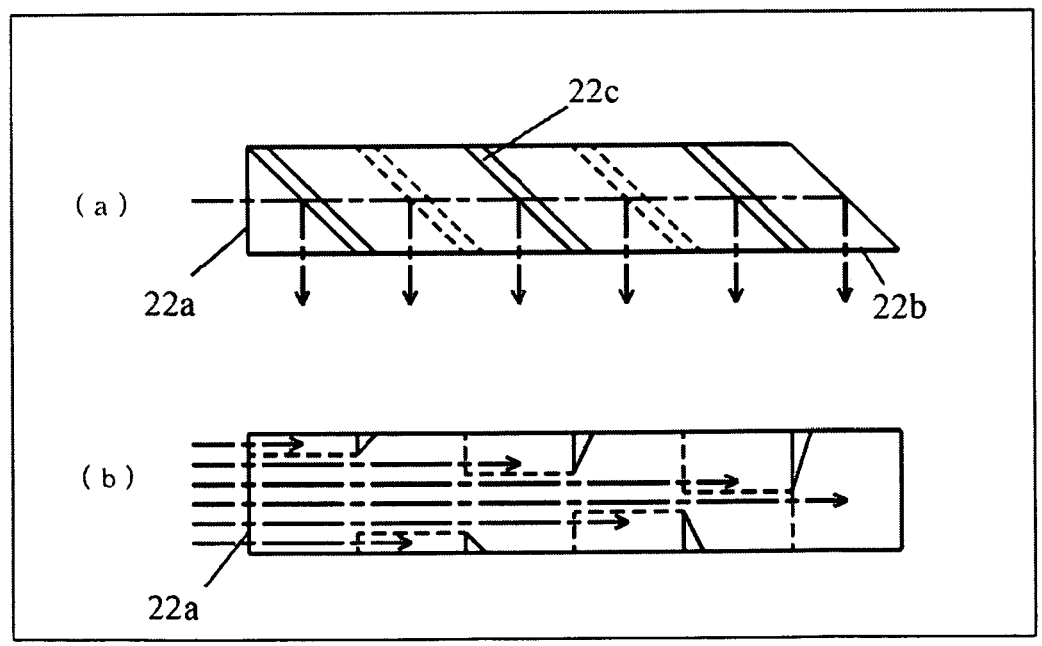
FIG. 6 is a top view and a side elevation view of a light guide 22.

The different element, the light guide 22, will be described below, and the other elements will be denoted by the same numerals as those of the corresponding elements of the first embodiment and will not be described. (a) of FIG. 6 is a top view of the light guide 22. (b) of FIG. 6 is a side elevation view of the light guide 22 as viewed from the light-guiding plate 3. Dashed-dotted lines in FIG. 6 represent rays of light.

The light guide 22 is shaped as a rectangular parallelepiped whose top surface and bottom surface are provided with a mirror array 22c. The light guide 22 makes the RGB light, emitted from the light source section 1, incident on an incident surface 22a, which is one side surface of the light guide 22, and emits the resulting RGB light from an emitting surface 22b, which is a main surface of the light guide 22, while using the reflection caused by the mirror array 22c. The mirror array 22c, provided on the light guide 22, is shaped so as to have a plurality of reflecting surfaces formed alternately on the top and bottom surfaces at equal intervals in a Y-direction and angled at approximately 45° to the incident surface 22a. In addition, the plurality of reflecting surfaces are formed so that the farther from the incident surface 22a, the larger the area of the reflecting surface.

The RGB light that is emitted from the light source section 1 while polarized in a Z-direction and slightly diverges is incident on the light guide 22. At this time, the positional relation between the light source section 1 and the light guide 22 is determined so that the polarization direction of the RGB light is perpendicular to or parallel to the long side and the short side of the incident surface 22a. The light incident on the incident surface 22a is reflected from and deflected approximately 90° by the plurality of reflecting surfaces provided on the mirror array 22c, on the top and bottom surfaces, and is emitted from the emitting surface 22b. Consequently, the linear light extending in the Y-direction is emitted nearly perpendicularly from the emitting surface 22b.

Here, due to the positional relation between the light source section 1 and the light guide 22, the polarization direction of the light incident on the incident surface 22a is orthogonal to a surface containing the traveling direction of the light and the normal vector of the reflecting surfaces provided on the mirror array 22c, and therefore the polarization direction does not change even when the light is reflected from the mirror array 22c. Thus a large portion of the light is emitted from the light guide 22 while polarized in the Z-direction. The light emitted from the light guide 22 is incident on the light-guiding plate 3.

As described above, based on the third embodiment of the present invention, the use of laser devices as a light source makes it possible to increase in size an edge-light planar illuminating device that is suitable to be thin, and also possible to realize a liquid crystal display device having a wide color gamut. In addition, the provision of a mirror array on the top and bottom surfaces of a light guide makes it possible to form large reflecting surfaces and therefore makes it easy to appropriately form the light guide. Thus it is possible to reduce the angle variation of the light emitted from the light guide. This makes it possible to reduce the polarization variation of the light emitted from a light-guiding plate, and therefore possible to further improve the efficiency.

Figure 8:
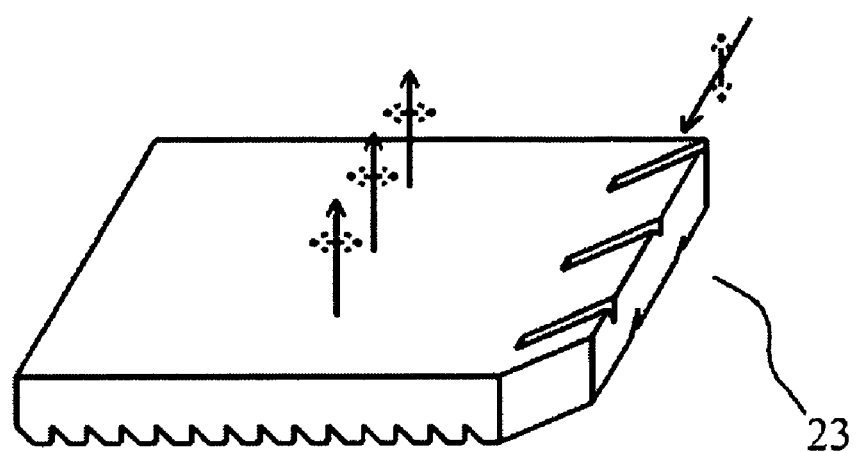
FIG. 8 is a perspective view showing another structure of the planar illuminating device according to the third embodiment.

Note that in the third embodiment the emitting surface 22b of the light guide 22 is not required to totally reflect the propagated light. Accordingly, the light guide 22 and the light-guiding plate 3 can be produced as the same member in an integral manner, as in a component 23 shown in FIG. 8, and therefore can contribute to the reduction of the number of the components and the reduction of the number of the steps of the manufacturing process.

(Fourth Embodiment)

Figure 9:
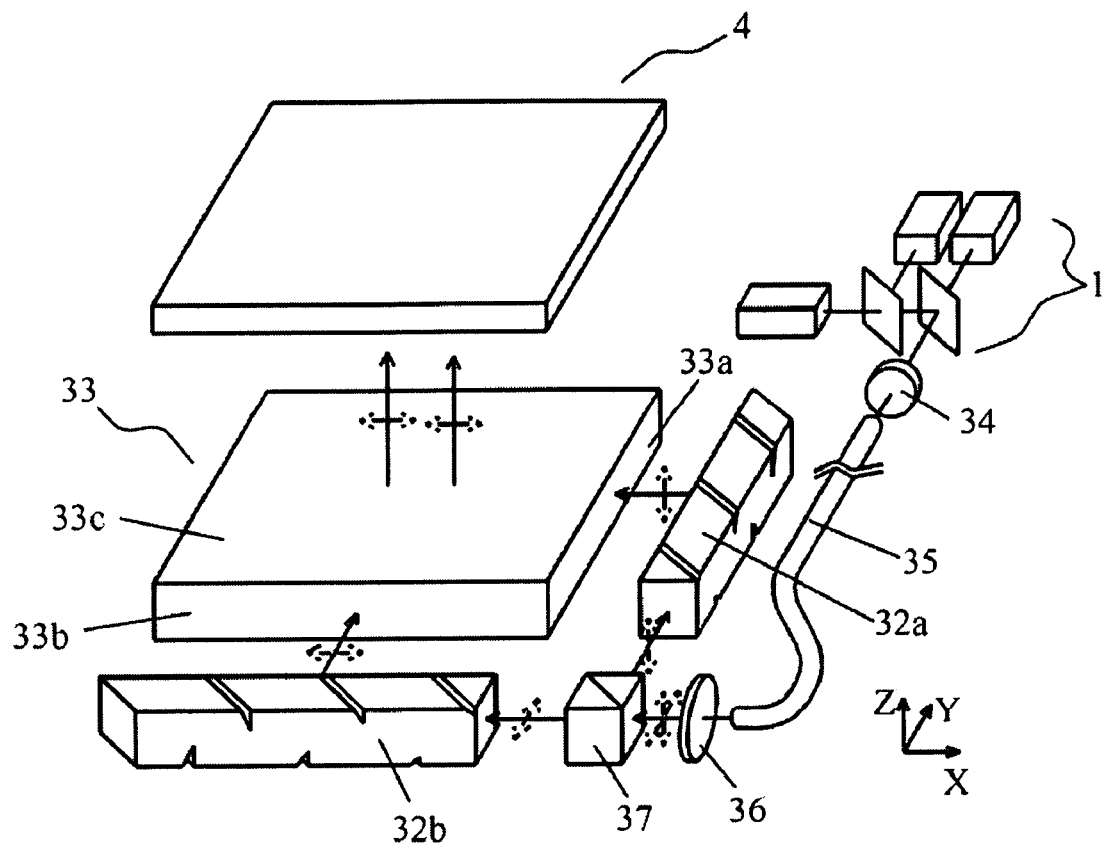
FIG. 9 is a perspective view showing the structure of a liquid crystal display device according to a fourth embodiment of the present invention.

FIG. 9 is a perspective view showing the structure of a liquid crystal display device according to a fourth embodiment of the present invention. The liquid crystal display device according to the fourth embodiment includes a planar illuminating device provided with a light source section 1, a collecting lens 34, an optical fiber 35, a collimating lens 36, a polarizing beam splitter 37, light guides 32a and 32b, and a light-guiding plate 33, and also includes a liquid crystal display panel 4. The light guides 32a and 32b of the fourth embodiment are each the same in structure as the light guide 22 described in the third embodiment.

The collecting lens 34 collects the light emitted from the light source section 1. The collimating lens 36 collimates the light incident thereon. The polarizing beam splitter 37 transmits P-polarized light of the incident light therethrough and reflects S-polarized light of the incident light.

Figure 10:
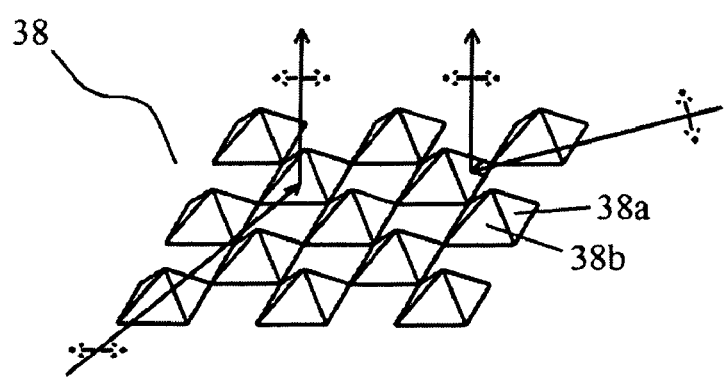
FIG. 10 is a diagram showing an example of a mirror array 38 formed on a light-guiding plate 33.

The light-guiding plate 33 is shaped as a rectangular parallelepiped whose one main surface is provided with a mirror array 38 (FIG. 10). The light-guiding plate 33 makes the RGB light, emitted from the light guides 32a and 32b, incident on incident surfaces 33a and 33b, which are side surfaces of the light-guiding plate 33, and emits the resulting RGB light from an emitting surface 33c, which is the other main surface, while using the reflection caused by the mirror array 38. As shown in FIG. 10, the mirror array 38, provided on the light-guiding plate 33, has reflecting surfaces 38a whose normal vector is orthogonal to a Y-axis, and also has reflecting surfaces 38b whose normal vector is orthogonal to an X-axis.

Next, the state of the RGB light propagated in the liquid crystal display device having the above structure will be described.

The RGB light emitted from the light source section 1 is collected by the collecting lens 34, is transmitted through the optical fiber 35, is collimated by the collimating lens 36, and is incident on the polarizing beam splitter 37. The polarizing beam splitter 37 makes incident thereon the RGB light whose polarization is disturbed by the optical fiber 35, transmits the P-polarized light therethrough so as to make the transmitted P-polarized light incident on an incident surface 32a of the light guide 32b, and reflects the S-polarized light so as to make the reflected S-polarized light incident on an incident surface 32aa of the light guide 32a.

As described above, the light guide 32a emits a large portion of the S-polarized light (light polarized in a Z-direction) incident on the incident surface 32aa to the incident surface 33a of the light-guiding plate 33 from an emitting surface 32ab without changing the polarization direction. The light guide 32b emits a large portion of the P-polarized light (light polarized in an X-direction) incident on the incident surface 32a to the incident surface 33b of the light-guiding plate 33 from an emitting surface 32bb without changing the polarization direction.

The light incident on the incident surface 33a and polarized in the Z-direction is propagated within the light-guiding plate 33, is reflected from and deflected by the reflecting surfaces 38a of the mirror array 38, and is emitted from the emitting surface 33c while polarized in the X-direction. The light incident on the incident surface 33b and polarized in the X-direction is propagated within the light-guiding plate 33, is reflected from and deflected by the reflecting surfaces 38b of the mirror array 38, and is emitted from the emitting surface 33c while polarized in the X-direction.

As described above, based on the fourth embodiment of the present invention, even unpolarized light that has been transmitted through an optical fiber can be emitted from a light-guiding plate while uniformly polarized. This makes it possible to improve the transmittance of a liquid crystal display panel, and therefore possible to realize a liquid crystal display device having low power consumption. This also makes it possible to increase the freedom of placing a light source since an optical fiber can be used.

As an example of the freedom of placing a light source. FIG. 11 shows the structure of the liquid crystal display device applied to a laptop. The light source section 1 and the light-guiding plate 33 can be thus placed in different housings, and therefore it is possible to form a liquid crystal display section in an extremely thin manner. In addition, light is unpolarized until immediately prior to the polarizing beam splitter 37, and therefore can be folded at an A-A axis in FIG. 11.

(Fifth Embodiment)

Figure 12:
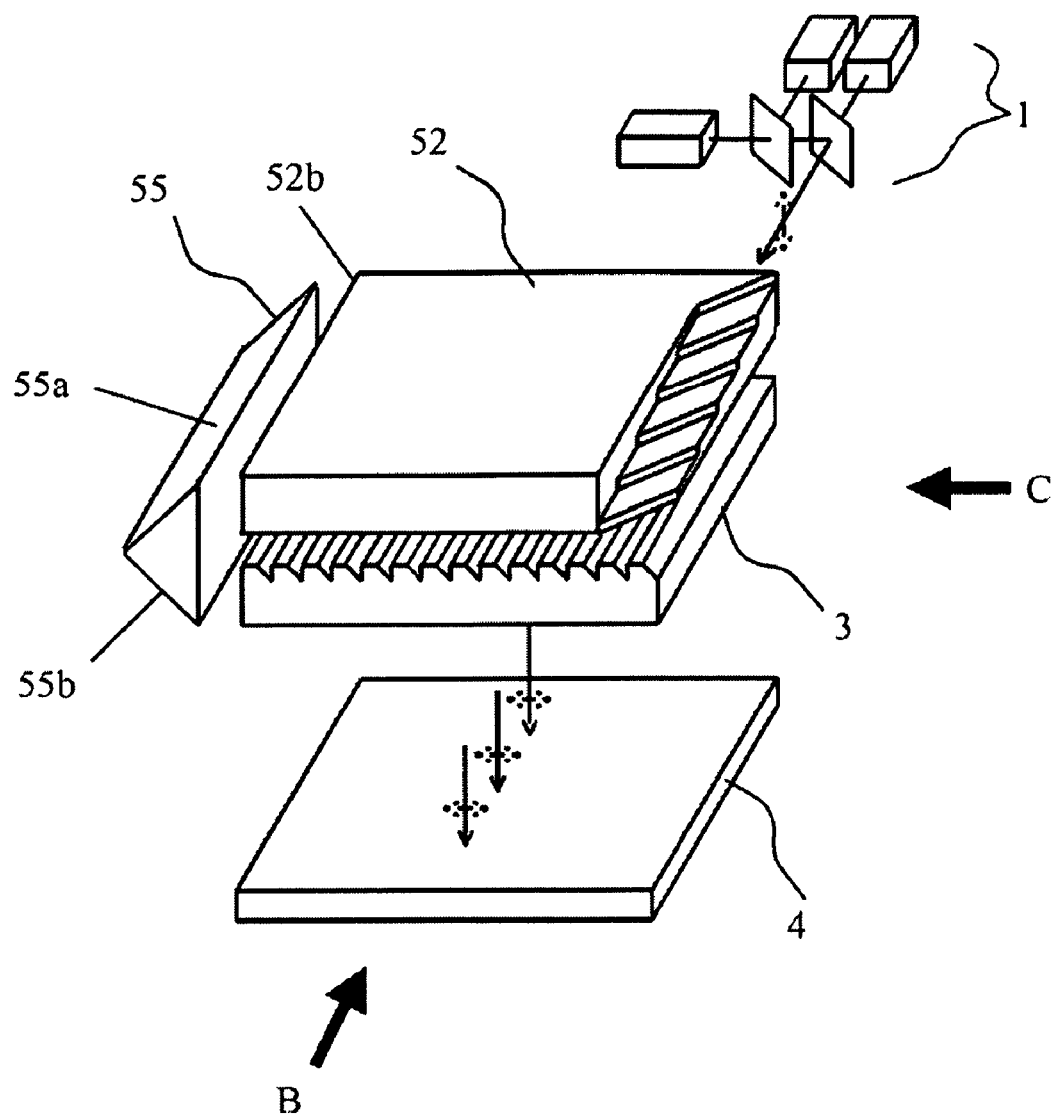
FIG. 12 is a perspective view showing the structure of a liquid crystal display device according to a fifth embodiment of the present invention.

FIG. 12 is a perspective view showing the structure of a liquid crystal display device according to a fifth embodiment of the present invention. The liquid crystal display device according to the fifth embodiment includes a planar illuminating device provided with a light source section 1, a light guide 52, a connection section 55, and a light-guiding plate 3, and also includes a liquid crystal display panel 4. The liquid crystal display device according to the fifth embodiment is a variation of the liquid crystal display device according to the second embodiment, and the fifth embodiment is different from the second embodiment in that the fifth embodiment uses the light guide 52 and the connection section 55.

The different elements, the light guide 52 and the connection section 55, will be described below, and the other elements will be denoted by the same numerals as those of the corresponding elements of the second embodiment and will not be described. (a) of FIG. 13 is a diagram showing the planar illuminating device of FIG. 12 as viewed from an arrow B. (b) of FIG. 13 is a diagram showing the planar illuminating device of FIG. 12 as viewed from an arrow C.

The light guide 52 is shaped so as to have the light guide 12 of the second embodiment and a given rectangular parallelepiped integrally formed with the emitting surface 12b as a contact surface. The connection section 55 is formed of glass or resin such as acrylic, so that side surfaces 55a and 55b deflect the incident light by totally reflecting the incident light or using a reflecting coating.

The RGB light that is emitted from the light source section 1 while polarized in a Z-direction and is incident on the light guide 52 is reflected from and deflected approximately 90° by reflecting surfaces of a mirror array 52c of the light guide 52, and is emitted from an emitting surface 52b. Consequently, the linear light extending in a Y-direction is emitted nearly perpendicularly from the emitting surface 52b while uniformly polarized in the Z-direction.

The light emitted from the light guide 52 is incident on the connection section 55, is turned around by being deflected perpendicularly by each of the side surfaces 55a and 55b, and is emitted from the connection section 55. Here, if the light guide 52 is tapered so that the closer to the connection section 55, the thicker the light guide 52, it is possible to reduce the variation of the traveling direction of the light emitted from the light guide 52. Accordingly, the side surfaces 55a and 55b can also be formed so as to totally reflect the light. In this case, a reflecting coating is unnecessary, and thus it is possible to reduce the cost. The light emitted from the connection section 55 is incident on an incident surface 3a of the light-guiding plate 3.

As described above, based on the fifth embodiment of the present invention, the use of laser as a light source makes it possible to realize a thin liquid crystal display device having a wide color gamut. In addition, the loss caused by a backlight-side polarizing plate is small since the polarization of backlight illumination is uniform, and therefore it is possible to realize high brightness and low power consumption. The backlight illumination, which is uniform without uneven brightness, also makes it possible to realize a high-quality liquid crystal display device.

Note that the connection section 55, the light guide 52, and the light-guiding plate 3 may be optically bonded to each other or may be integrally molded of resin. This makes it possible to reduce the transmission loss of light in the incident surfaces and the emitting surfaces, and therefore possible to further improve the light utilization efficiency and reduce the cost.

(Sixth Embodiment)

In the first through fifth embodiments, the descriptions are given of the liquid crystal display devices that reduce uneven brightness of the light emitted from a light-guiding plate and thereby improve the utilization efficiency of the light, with the use of the light guide structures specific to the present invention.

Next, in the following sixth and seventh embodiments, descriptions will be given of liquid crystal display devices that further include, in addition to the above embodiments, a light orientation guide section capable of controlling uneven brightness so as to further reduce uneven brightness or to generate intentional uneven brightness.

Figure 14:
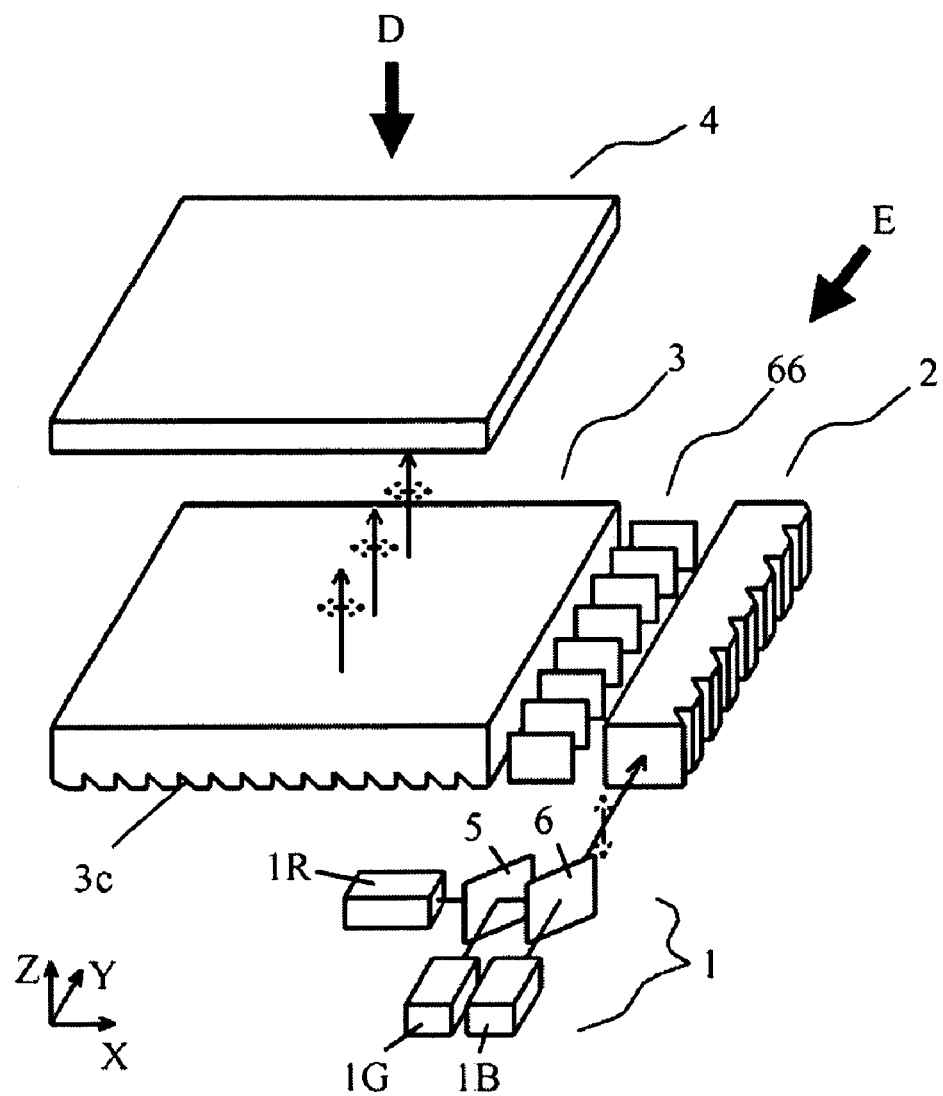
FIG. 14 is a perspective view showing the structure of a liquid crystal display device according to a sixth embodiment of the present invention.

FIG. 14 is a perspective view showing the structure of a liquid crystal display device according to a sixth embodiment of the present invention. The liquid crystal display device according to the sixth embodiment includes a planar illuminating device provided with a light source section 1, a light guide 2, a light orientation guide section 66, and a light-guiding plate 3, and also includes a liquid crystal display panel 4. The sixth embodiment is different from the first embodiment in that the sixth embodiment further includes the light orientation guide section 66.

Figure 15:
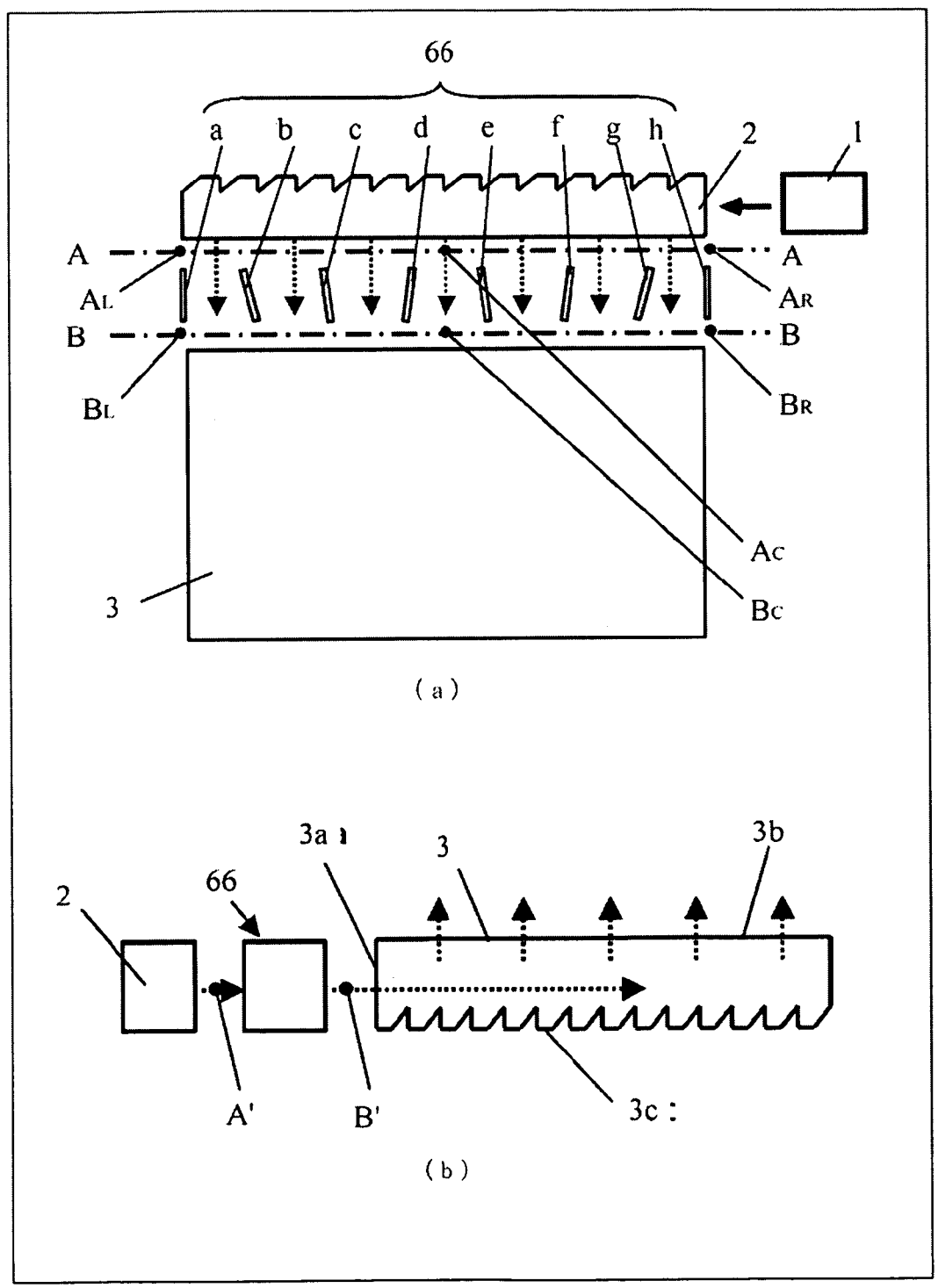
FIG. 15 is a top view and a side elevation view showing a planar illuminating device according to the sixth embodiment.

The light orientation guide section 66 will be described below, and the other elements will be denoted by the same numerals as those of the corresponding elements of the first embodiment and will not be described. (a) of FIG. 15 is a diagram showing the planar illuminating device of FIG. 14 as viewed from an arrow D. (b) of FIG. 15 is a diagram showing the planar illuminating device of FIG. 14 as viewed from an arrow E.

The light orientation guide section 66 includes a plurality of orientation guide plates 66a through to 66h. The orientation guide plates 66a through to 66h are each a movable flat plate that has a rotation axis in a Z-direction and reflects light. The shapes of the orientation guide plates 66a through 66h are not limited to flat plates, and may be various shapes, whose cross sections are circular, elliptical, streamlined, or the like. If the sharpness of each orientation guide plate is removed, it is possible to make incident and emit light more uniformly, and therefore possible to reduce the light amount loss caused by the scattering loss on the edge surfaces of the orientation guide plates.

For example, when the light amount distribution of the light emitted from an emitting surface 2b of the light guide 2 has a tendency shown in (a) of FIG. 16, the orientation guide plates 66a through to 66h are moved so as to change a part or the whole of the traveling direction of the light that travels from the light guide 2 to the light-guiding plate 3. This makes it possible to easily adjust the light amount distribution of the light incident on an incident surface 3a of the light-guiding plate 3 to be uniform as shown in (b) of FIG. 16. In this example, the width between the orientation guide plates 66d and 66b, the width between the orientation guide plates 66d and 66e, and the width between the orientation guide plates 66g and 66h may each be changed so as to be greater on the light-guiding plate 3 side than on the light guide 2 side in (d) of FIG. 15.

The light orientation guide section 66 is basically used in a fixed manner to make uniform the variation of the light amount distribution caused at the manufacturing stage, but may also be used to adjust the light amount distribution, automatically or manually, in accordance with the usage of the product and the like. For example, in a large-screen display, since viewpoints are focused on the center of the screen and the user is not concerned even if the brightness of the edge of the screen is somewhat lower, the amount of light of the edge of the screen may be reduced, whereby it is possible to reduce the power consumption. Alternatively, the light amount distribution may possibly be changed in accordance with the viewing position of the user (e.g., the brightness of the edge of the screen may be reduced when the user is close to the screen). In this case, the above structure further includes a sensor that detects the user's position and a control section that adjusts the light orientation guide section 66 in accordance with the detection result.

As described above, based on the sixth embodiment of the present invention, the adjustment of the traveling direction of the light emitted from the emitting surface 2b of the light guide 2 with the use of the light orientation guide section 66 makes it possible to obtain, in the light-guiding plate 3, light having a highly-uniform brightness distribution or a particular brightness distribution.

Figure 17B:
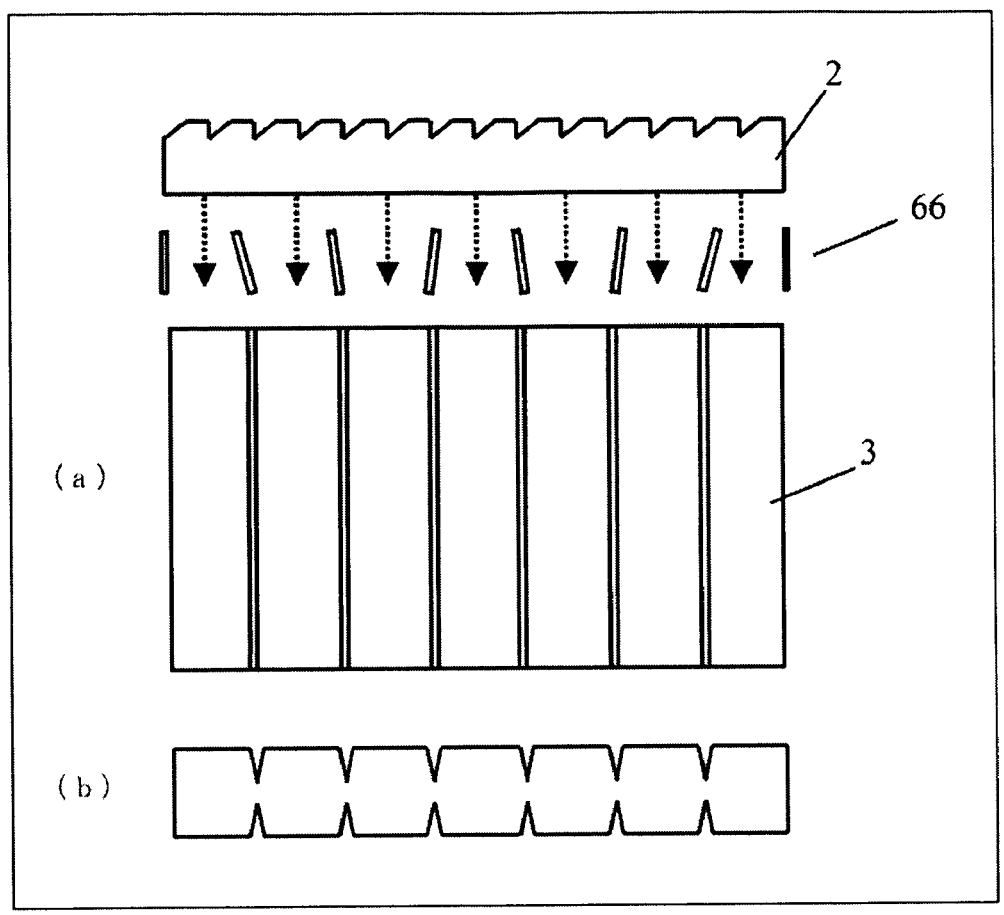
FIG. 17B is a top view and a side elevation view showing yet another structure of the light-guiding plate 3.

Note that the structure of the light-guiding plate 3 described in the sixth embodiment is illustrative, and the structures shown in FIGS. 17A and 17B may also be used. FIG. 17A shows an example where the farther from a light incident surface 3a a mirror array 3c is, the shorter the interval between the reflecting surfaces are. FIG. 17B shows an example where grooves that correspond to the orientation guide plates 66a through to 66h are provided on both one main surface and the other main surface of the light-guiding plate 3, so as to absorb the incidence angle variation of light. In this structure, when black bars are displayed on both ends of the screen in the case, for example, where video having an aspect ratio of 4:3 is displayed on a 16:9 display, the control section may adjust the light orientation guide section 66 so that backlight illumination is not supplied to both ends of the screen. This makes it possible to reduce the power consumption.

Figure 18:
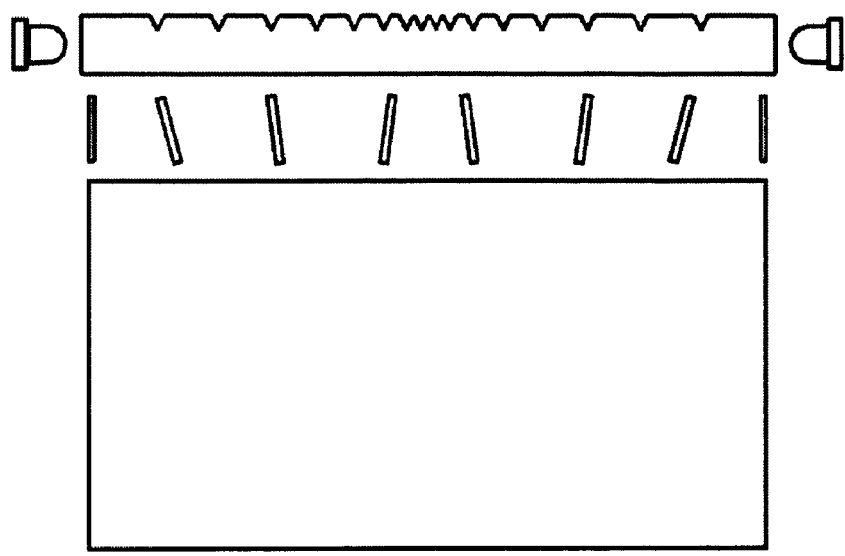
FIG. 18 is a top view showing another structure of a light source section 1 and the light guide 2.
Figure 19:
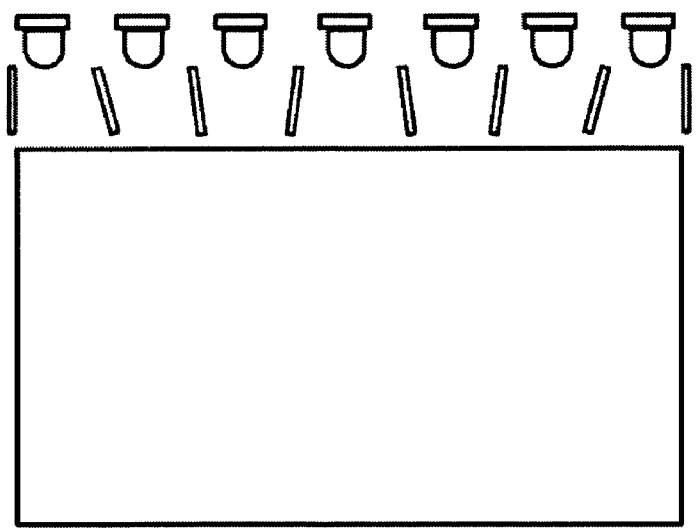
FIG. 19 is a top view showing yet another structure of the light source section 1 and the light guide 2.
Figure 20:
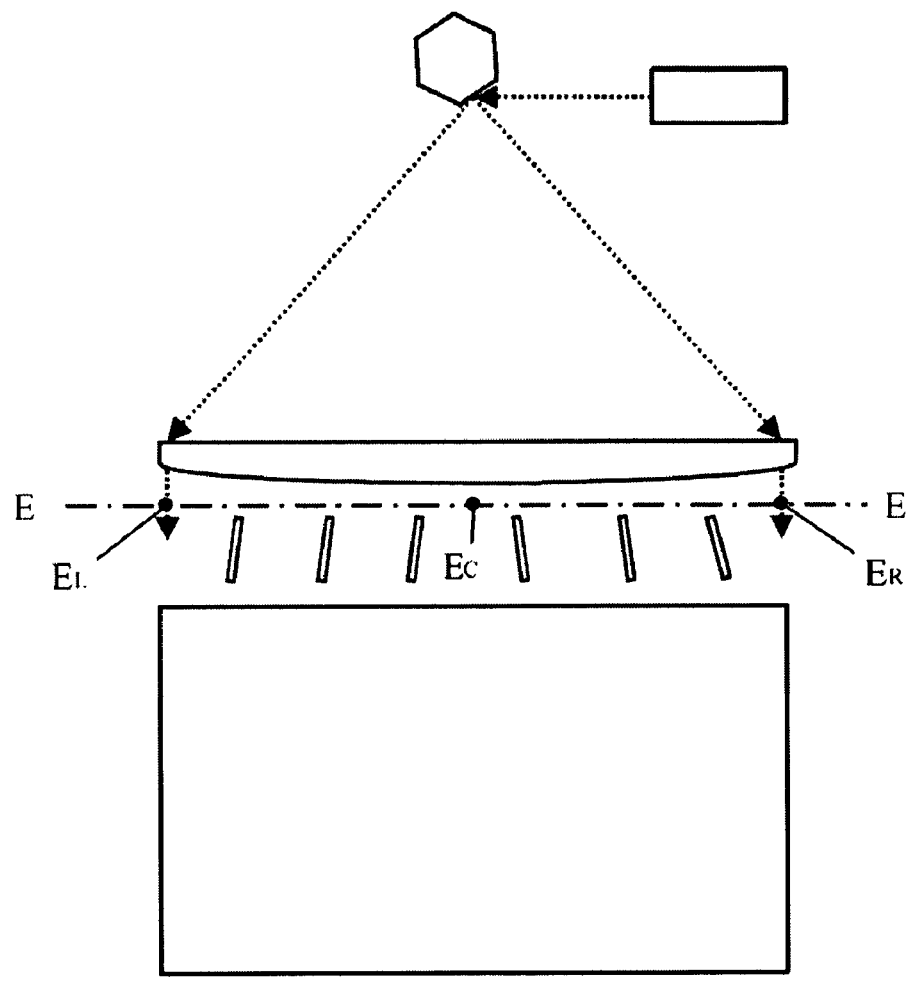
FIG. 20 is a top view showing yet another structure of the light source section 1 and the light guide 2.
Figure 21:
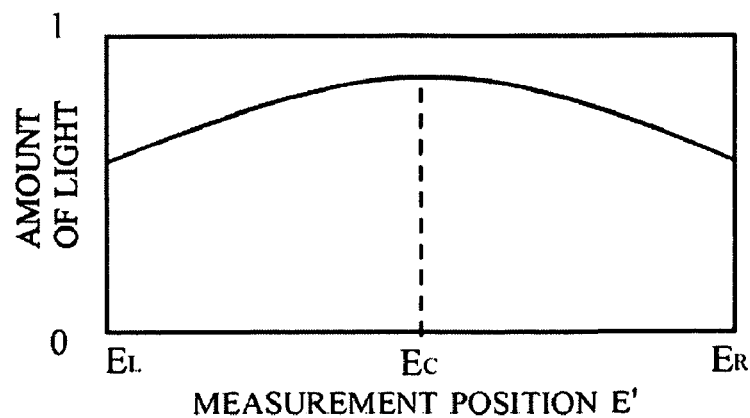
FIG. 21 is a diagram showing the light amount distribution before light passes through the light orientation guide section 66 in the structure of FIG. 20.

Alternatively, it is also possible to obtain useful effects of the light orientation guide section 66 with the use of: a conventional structure including LED devices and a light-guiding rod instead of the structure including the light source section 1 and the light guide 2 (FIG. 18); a structure including a plurality of LED devices (FIG. 19); or a structure including a laser light source that emits parallel light, a polygon mirror (or a galvanometer mirror or a one-dimensional diffusion element), and a cylindrical lens (FIG. 20). In FIG. 20 the tendency of the light amount distribution is known in advance as shown in FIG. 21, and therefore it is also possible to design the curvature of the cylindrical lens, the directions of the orientation guide plates, and the like in a fixed manner.

Yet alternatively, the orientation guide plates 66a through to 66h may be changed so as to not only rotate about the axes in the Z-direction but also move in a Y-direction.

Figure 22:
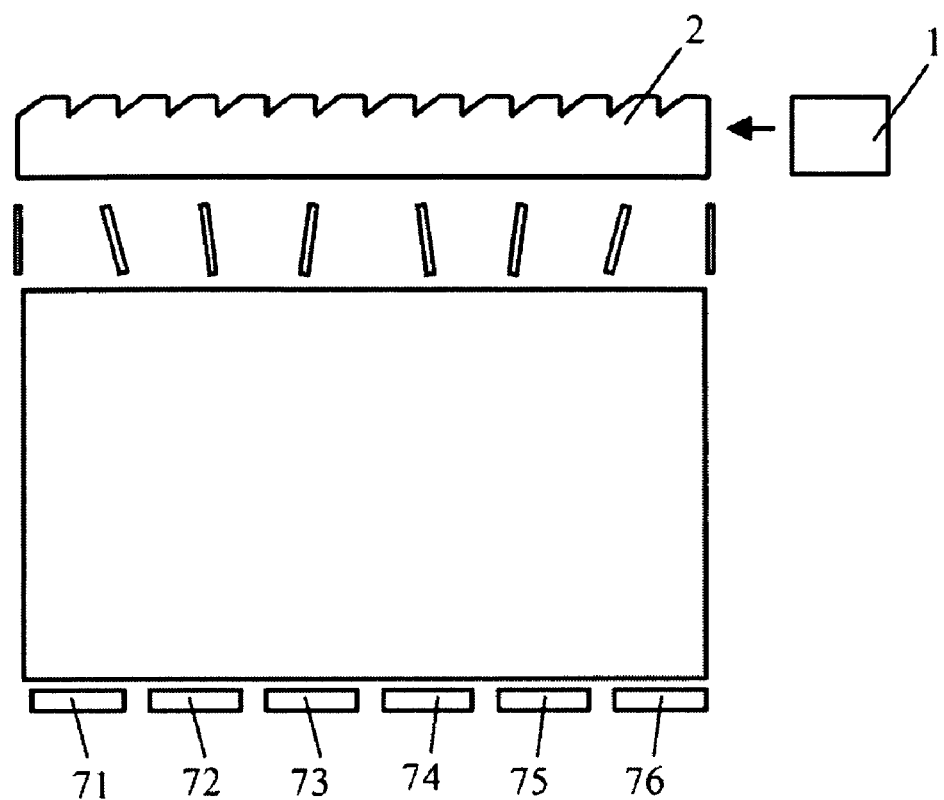
FIG. 22 is a top view showing the structure of a planar illuminating device according to another embodiment of the present invention.

Yet alternatively, a plurality of light-receiving devices 71 through to 76 may be provided on the opposite side surface to the incident surface 3a of the light-guiding plate 3 (FIG. 22), and feedback control may be performed so that the orientation guide plates 66a through to 66h are changed in accordance with the amount of light received by the plurality of light-receiving devices 71 through 76.

(Seventh Embodiment)

Figure 23:
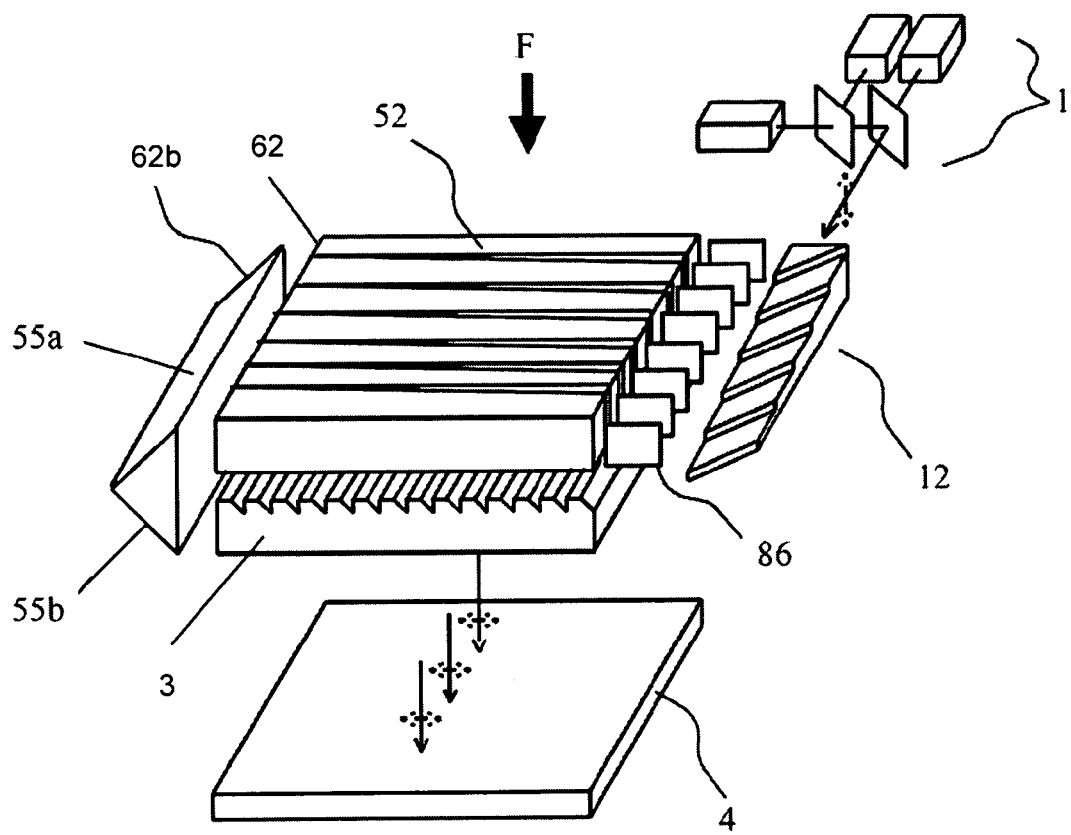
FIG. 23 is a perspective view showing the structure of a planar illuminating device according to a seventh embodiment of the present invention.

FIG. 23 is a perspective view showing the structure of a liquid crystal display device according to a seventh embodiment of the present invention. The liquid crystal display device according to the seventh embodiment includes a planar illuminating device provided with a light source section 1, a first light guide 12, a light orientation guide section 86, a second light guide 52, a connection section 55, and a light-guiding plate 3, and also includes a liquid crystal display panel 4. The liquid crystal display device according to the seventh embodiment is a variation of the liquid crystal display device according to the fifth embodiment, and the seventh embodiment is different from the fifth embodiment in that the seventh embodiment uses the first light guide 12, the light orientation guide section 86, and the second light guide 62.

Figure 24:
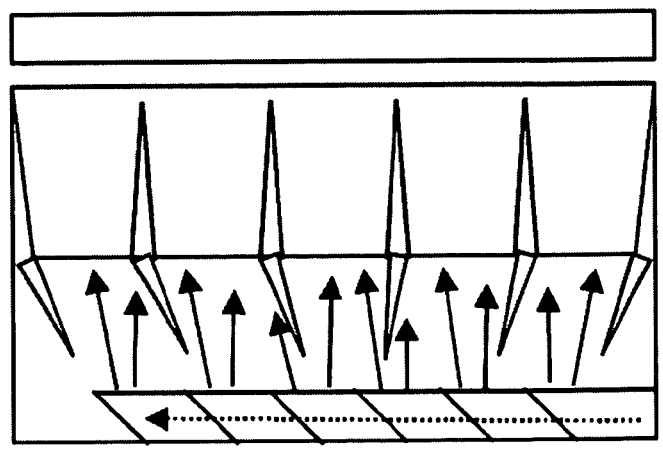
FIG. 24 is a top view showing the structure of the planar illuminating device according to the seventh embodiment.

These different elements will be described below, and the other elements will be denoted by the same numerals as those of the corresponding elements of the first and fifth embodiments and will not be described. FIG. 24 is a diagram showing the planar illuminating device of FIG. 23 as viewed from an arrow F.

The light orientation guide section 86 includes a plurality of orientation guide plates 86a through to 86f. The orientation guide plates 86a through to 86f are each a movable wedge-shaped plate that has a rotation axis in a Z-direction and reflects light. The second light guide 62 is trapezoid-shaped so as to guide to the connection section 55 the light divided by the light orientation guide section 86.

The RGB light emitted from an emitting surface 12b of the first light guide 12 is divided by the plurality of orientation guide plates 86a through to 86f, and is incident on an incident surface 62d of the second light guide 62. The light incident on the second light guide 62 is emitted to the connection section 55.

As described above, based on the seventh embodiment of the present invention, the adjustment of the traveling direction of the light emitted from the emitting surface 12b of the light guide 12 with the use of the light orientation guide section 86 makes it possible to obtain, in the light-guiding plate 3, light having a highly-uniform brightness distribution or a particular brightness distribution.

Figure 25:
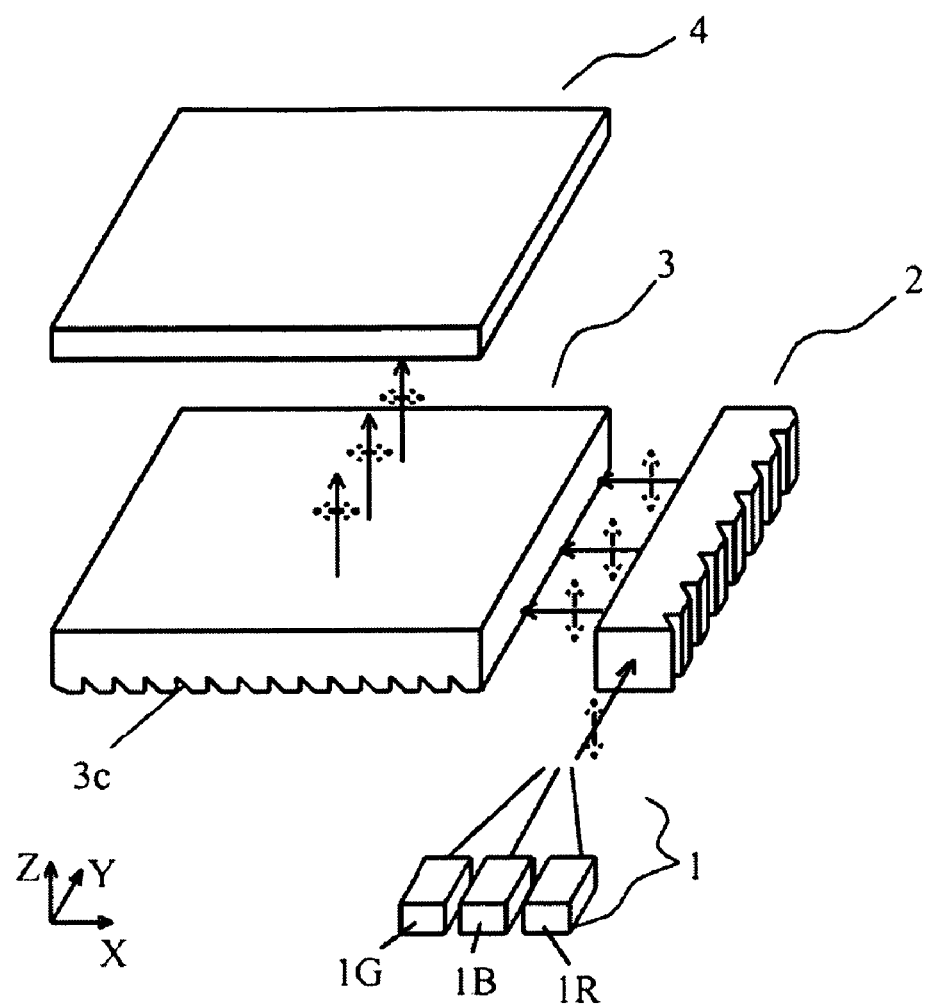
FIG. 25 is a diagram showing another structure of the light source section 1.

Note that in the first through seventh embodiments, the light source section 1 is used that includes the red laser light source 1R, the green laser light source 1G, the blue laser light source 1B, and the dichroic mirrors 5 and 6. However, as the light source section 1, a structure may be used in which an R-light, a G-light, and a B-light are separately incident on a light guide and are combined within the light guide (FIG. 25). With this structure, dichroic mirrors are unnecessary, and therefore it is possible to reduce the cost.

Industrial Applicability

A planar illuminating device of the present invention is applicable to a liquid crystal display device and the like, and is useful for improving light utilization efficiency, reducing power consumption, realizing high brightness without color irregularities, and the like.

The invention claimed is:

1. A planar illuminating device comprising:
    a light source section that emits linearly polarized laser light;
    a rod-like light guide including an end surface incident to the linearly polarized laser light emitted from the light source section, so as to receive, as incident laser light, the linearly polarized laser light emitted from the light source section and including a first side surface that emits the incident laser light received from the light source section; and
    a light-guiding plate including an incident surface incident to the laser light emitted from the rod-like light guide, so as to receive the laser light emitted from the rod-like light guide and including an emitting surface that emits the laser light received from the rod-like light guide,
    wherein a cross section of the rod-like light guide that is orthogonal to a propagation direction of the incident laser light is rectangular,
    wherein the rod-like light guide includes a mirror array formed on at least one of: a second side surface that is opposite to the first side surface; and a third side surface and a fourth side surface adjacent to the first side surface,
    wherein the mirror array includes a plurality of reflecting surfaces that totally reflect the incident laser light received by the end surface, so as to emit the laser light from the first side surface, and
    wherein the linearly polarized laser light emitted from the light source section is incident to the end surface of the rod-like light guide while being polarized perpendicularly to the first side surface or the third side surface.

2. The planar illuminating device according to claim 1, wherein the rod-like light guide is shaped so as to have the mirror array on either one of the third side surface and the fourth side surface, and
    wherein the plurality of reflecting surfaces of the mirror array are formed in a stepped manner.

3. The planar illuminating device according to claim 1, wherein the rod-like light guide is shaped so as to have the mirror array on either one of the third side surface and the fourth side surface, and
    wherein the plurality of reflecting surfaces on the mirror array are formed having grooves, such that an area of each of the grooves increases the farther away each of the grooves is from the end surface.

4. The planar illuminating device according to claim 1, wherein the light-guiding plate has a plurality of deflecting grooves parallel to the incident surface and located on a surface that is opposite to the emitting surface, and
    wherein the plurality of deflecting grooves are shaped so as to totally reflect, to the emitting surface, the laser light incident to the incident surface.

5. The planar illuminating device according to claim 1, wherein the plurality of reflecting surfaces of the mirror array are angled at 45 degrees to the end surface, so as to reflect the received incident laser light.

6. The planar illuminating device according to claim 1, wherein the end surface of the rod-like light guide causes the received incident laser light to diverge or diffuse in a one-dimensional direction.

7. The planar illuminating device according to claim 1, wherein the plurality of reflecting surfaces of the rod-like light guide cause the totally reflected laser light to diverge or diffuse in a one-dimensional direction.

8. The planar illuminating device according to claim 1, wherein the rod-like light guide and the light-guiding plate are integrally molded together.

9. The planar illuminating device according to claim 1, wherein the light source section includes:
    a laser light source;
    an optical fiber that propagates laser light emitted from the laser light source; and
    a polarizing beam splitter that polarizes and splits the laser light propagated through the optical fiber, wherein the light-guiding plate includes a second incident surface arranged such that the laser light received by the incident surface and laser light received by the second incident surface, from two directions, are orthogonal to each other, and wherein one part of the polarized laser light emitted from the polarizing beam splitter is incident to the incident surface and is emitted from the emitting surface, and another part of the polarized laser light emitted from the polarizing beam splitter is incident to the second incident surface and is emitted from the emitting surface.

10. The planar illuminating device according to claim 1, wherein the planar illuminating device includes a connection section located across the rod-like light guide and the light-guiding plate, and wherein the connection section turns the laser light emitted from the first side surface of the rod-like light guide by 180 degrees, so as to emit the laser light incident to the incident surface of the light-guiding plate.

11. The planar illuminating device according to claim 1, wherein the planar illuminating device includes a light orientation guide section provided between the rod-like light guide and the light-guiding plate so as to make the laser light, emitted from the rod-like light guide, incident to the incident surface of the light-guiding plate by changing an optical path of the laser light emitted from the rod-like light guide, and wherein a light amount distribution on the light-guiding plate can be changed.

12. The planar illuminating device according to claim 11, wherein the light orientation guide section includes a plurality of plate-like reflecting members, each having adjustable positions or angles.

13. The planar illuminating device according to claim 12, wherein each plate-like reflecting member of the plurality of plate-like reflecting members has an edge portion that is thinner than a central portion.

14. The planar illuminating device according to claim 12, wherein the light-guiding plate includes a plurality of light guides being separate in accordance with the positions of the plurality of plate-like reflecting members.

15. The planar illuminating device according to claim 11, wherein the planar illuminating device includes a control section that adjusts the light orientation guide section, and wherein, when an image having an aspect ratio different from an aspect ratio of a screen is displayed, the control section adjusts the light orientation guide section so that the light amount distribution concentrates in a center of the light-guiding plate.

16. The planar illuminating device according to claim 15, wherein the control section adjusts the light orientation guide section in accordance with an instruction received from a user.

17. The planar illuminating device according to claim 11, further comprising:
a sensor that detects a viewing position of a user; and
a control section that adjusts the light orientation guide section,
wherein the control section adjusts the light orientation guide section in accordance with a distance between a display screen and the user, the distance being detected by the sensor.

18. The planar illuminating device according to claim 17, wherein, as the distance between the display screen and the user becomes shorter, the control section adjusts the light orientation guide section so that the light amount distribution concentrates more in a center of the light-guiding plate.

19. The planar illuminating device according to claim 11, further comprising:
a plurality of light-receiving devices that detect the light amount distribution of light incident to the light-guiding plate; and
a control section that adjusts the light orientation guide section,
wherein the control section adjusts the light orientation guide section in accordance with an amount of received light detected by the plurality of light-receiving devices.

20. A liquid crystal display device including:
the planar illuminating device according to claim 1; and
a liquid crystal display panel having a back surface, wherein
the planar illuminating device illuminates the liquid crystal display panel from the back surface.

* * * * *